(12) United States Patent
Heyne et al.

(10) Patent No.: US 11,919,417 B2
(45) Date of Patent: Mar. 5, 2024

(54) LOAD MANAGEMENT SYSTEM AND METHOD FOR MANAGING LOADS IN A POWER DISTRIBUTION GRID

(71) Applicant: Dr. Ing. h.c. F. Porsche Aktiengesellschaft, Stuttgart (DE)

(72) Inventors: Raoul Heyne, Wiernsheim (DE); Alexander Schneider-Schaper, Wiernsheim (DE); Martin Rezac, Prague (CZ); Barry Sole, Pforzheim (DE); Hartmut Chodura, Stuttgart (DE); Ulf Schlieben, Ditzingen (DE); Sunny Rohilla, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 291 days.

(21) Appl. No.: 17/094,043

(22) Filed: Nov. 10, 2020

(65) Prior Publication Data
US 2021/0138926 A1 May 13, 2021

(30) Foreign Application Priority Data

Nov. 11, 2019 (DE) .................... 10 2019 130 337.0

(51) Int. Cl.
*B60L 53/68* (2019.01)
*B60L 53/10* (2019.01)
*B60L 53/30* (2019.01)
*B60L 53/51* (2019.01)
*B60L 53/63* (2019.01)
(Continued)

(52) U.S. Cl.
CPC ............... *B60L 53/68* (2019.02); *B60L 53/11* (2019.02); *B60L 53/30* (2019.02); *B60L 53/51* (2019.02);
(Continued)

(58) Field of Classification Search
CPC .......... B60L 53/68; B60L 53/11; B60L 53/30; B60L 53/63; B60L 53/64; B60L 53/66;
(Continued)

(56) References Cited

U.S. PATENT DOCUMENTS 9,878,629 B2 * 1/2018 Lowenthal .............. B60L 53/11
2008/0278983 A1 * 11/2008 Park ......................... H02J 7/35
363/95
(Continued)

FOREIGN PATENT DOCUMENTS

CN 109130935 A 1/2019
DE 102011113376 A1 1/2013
(Continued)

*Primary Examiner* — Richard Isla
*Assistant Examiner* — Manuel Hernandez
(74) *Attorney, Agent, or Firm* — Buchanan Ingersoll & Rooney PC

(57) ABSTRACT

A load management system for managing loads in a power distribution grid. The load management system includes a control unit and at least two current transformers, which are each connected to the control unit by a signal cable. A first current transformer of the at least two current transformers is arranged in the power distribution grid such that the first current transformer is suitable for measuring a current level that is dominant in a grid connecting line of the power distribution grid, which grid connecting line is connected to a power supply company. A second current transformer of the at least two current transformers is arranged in the power distribution grid such that the second current transformer is suitable for measuring the current level that is dominant in a power line of the power distribution grid, which power line feeds at least one charging station of the power distribution grid.

16 Claims, 36 Drawing Sheets

Figure 1:
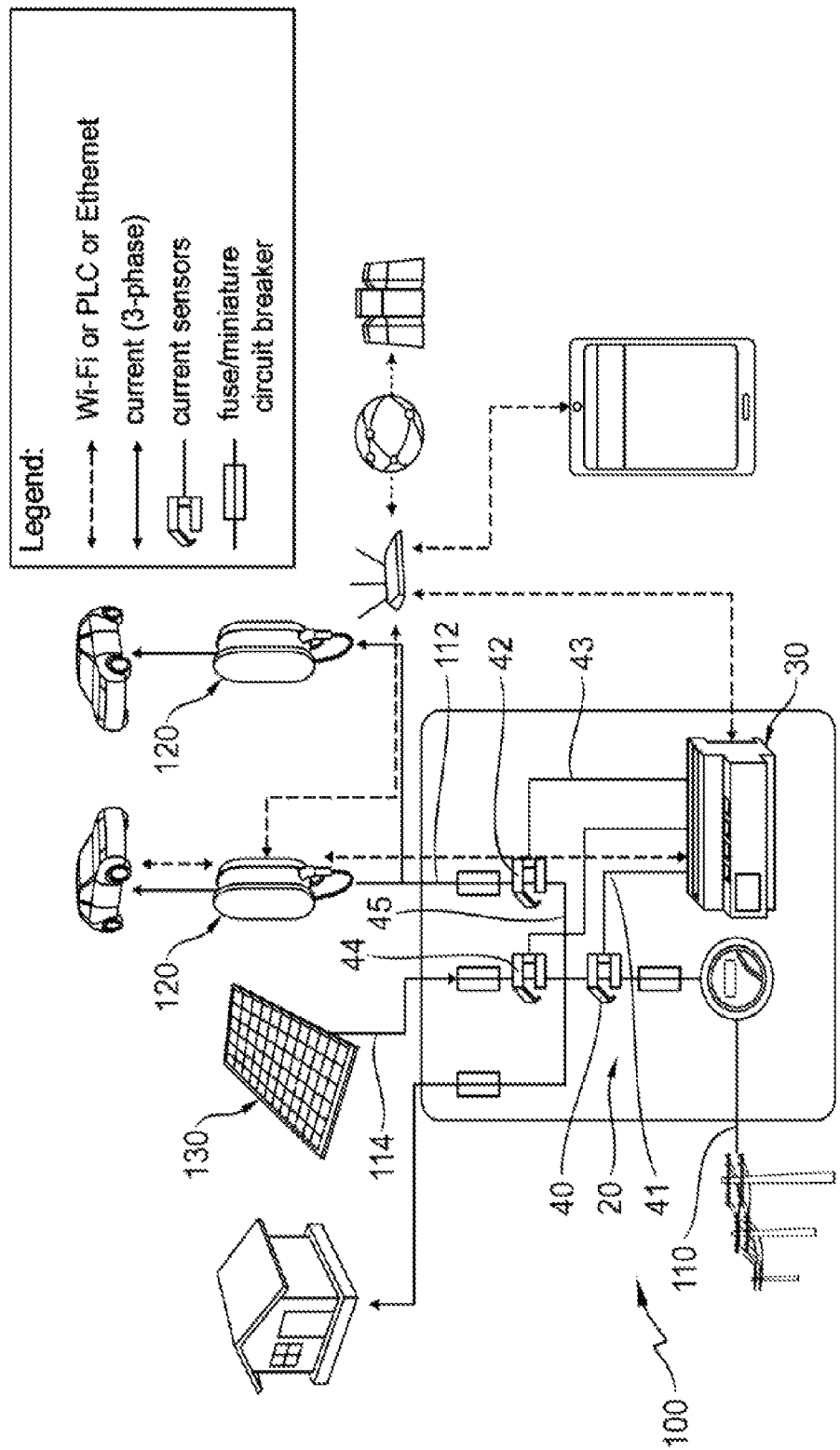

(51) Int. Cl.
  *B60L 53/64* (2019.01)
  *B60L 53/66* (2019.01)
  *H02J 3/32* (2006.01)
  *H02J 7/35* (2006.01)

(52) U.S. Cl.
  CPC ............... *B60L 53/63* (2019.02); *B60L 53/64* (2019.02); *B60L 53/66* (2019.02); *B60L 53/665* (2019.02); *H02J 3/322* (2020.01); *H02J 7/35* (2013.01); *B60L 53/305* (2019.02); *H02J 2310/60* (2020.01)

(58) Field of Classification Search
  CPC ...... B60L 53/665; B60L 53/305; B60L 53/51; H02J 3/322; H02J 13/00017; H02J 2310/60; H02J 7/35
  USPC ........................................................ 320/109
  See application file for complete search history.

(56) References Cited

U.S. PATENT DOCUMENTS

| | | | |
|---|---|---|---|
| 2009/0062967 A1 | 3/2009 | Kressner et al. | |
| 2010/0066170 A1* | 3/2010 | Schuler | H02J 9/002 307/31 |
| 2010/0179704 A1* | 7/2010 | Ozog | H02J 7/35 703/2 |
| 2011/0248678 A1 | 10/2011 | Wade et al. | |
| 2012/0265459 A1 | 10/2012 | Sfaelos | |
| 2014/0062401 A1 | 3/2014 | Gadh et al. | |
| 2014/0077762 A1 | 3/2014 | Spanos | |
| 2015/0102775 A1* | 4/2015 | Von Novak, III | B60L 53/68 320/109 |
| 2016/0137087 A1 | 5/2016 | Haas et al. | |
| 2018/0026455 A1* | 1/2018 | Kano | H02J 7/0013 320/112 |
| 2019/0199129 A1 | 6/2019 | Kobayashi et al. | |

FOREIGN PATENT DOCUMENTS

| | | | | |
|---|---|---|---|---|
| DE | 102014001535 A1 | | 2/2015 | |
| DE | 102014221211 A1 | | 4/2016 | |
| DE | 202013012651 U1 | | 2/2018 | |
| EP | 2735468 A2 | * | 5/2014 | .......... B60L 11/1844 |
| EP | 2810816 A2 | | 12/2014 | |
| JP | 6051404 B2 | | 12/2016 | |
| WO | 2007008390 A2 | | 1/2007 | |
| WO | WO-2010045790 A1 | * | 4/2010 | .......... H02J 13/0086 |
| WO | WO-2020194010 A1 | * | 10/2020 | ............. B60L 53/60 |

\* cited by examiner

| Dashboard | | | | | | |
|---|---|---|---|---|---|---|
| | Power M. | Connections | Settings | Home Installation | Installation Assistant | |

Tariff Settings

Photovoltaic
charging
History

Tariff Settings

Does your tariff change during the year ?  ● Yes ○ No

| Name | | |
|---|---|---|
| summer | from March | until August |
| winter | from August | until March |

+ Add new interval

Does your tariff change during the week ?  ● Yes ○ No

| Name | | |
|---|---|---|
| weekday | from Monday | until Saturday |
| weekend | from Saturday | until Monday |

+ Add new interval

Does your tariff change during the day ?  ○ Yes ● No

| Year | Week | ct/kWh |
|---|---|---|
| summer | Weekday | 25 |
| | weekend | 27 |
| winter | Weekday | 27 |
| | weekend | 28 |

Fig. 8

Dashboard  Power M.  Connections  Settings  Home Installation  Installation Assistant Tariff Settings
In-feed
Smart charging
Power history

In-feed

You will receive a feed-in payment from your electricity provider for excess power that you feed into the grid.

Please select the connection type for your photovoltaic installation.

● Load side ⓘ
○ Line side ⓘ

See example

Please enter your feed-in payment feed-in payment
0                    ct/kWh

Please enter the maximum amount of power that can be fed into the grid max. power feed
0                    kWh

Fig. 9

Dashboard  Power M.  Connections  Settings  Home Installation  Installation Assistant Tariff Settings  Smart charging In-feed
Smart charging
Power history Overcurrent protection
● Activated
In the event of consumption peaks, the overload protection ensures that the charging power is reduced and prevents the main fuse of the house connection from tripping. This ensures reliable charging of an EV at maximum available power.

Photovoltaic optimization
● Activated
Optimization means that self-generated power is preferably used for charging. This results in the charging power for the EV being dynamically adapted for the excess photovoltaic current.

Coordinated charging
● Activated
The EV is charged in the cheapest time window given the charging profile steected in the vehicle. Price optimization requires either a dynamic electricity tariff and/or a phtovoltaic installation.

○ Balanced ⓘ
● First-come
   First served Principle ⓘ
○ Priority List ⓘ

Fig. 10

Fig. 17

Dashboard　Power M.　Connections　Settings　Home Installation　Installation Assistant System　Maintenance ■ Maintenance
Diagnosis Device information Make and model name　HCM-0009
Part number:　1234-4567-8910
Serial number:　12-34-567-891
Software version:　9.1.1
Hardware version:　12345678-91

Connection information

Internet　◯ Internet connection inactive

WLAN　Connected
IP address　123.456.7.891
MAC address　12.34.56.78.91.01

Hotspot　Active
IP address　123.456.9.11
MAC address　12.34.56.78.91.11

Ethernet　Connected
IP address　123.456.7.911
MAC address　12.34.56.78.99.61

| Dashboard | Power M. | Connections | Settings | Home Installation | Installation Assistant |

System
Maintenance
Diagnosis

Diagnosis

| Search 🔍 | | | ○ Update | 💾 Download diagnosis file |
|---|---|---|---|---|
| Code ⇕ | Type ⇕ | Measured value | Time ⇕ | Description |
| B200 | ERROR | 260 Volt | Invalid date | The measurement is out of range |
| B200 | ERROR | 260 Volt | Invalid date | The measurement is out of range |
| B200 | ERROR | 260 Volt | Invalid date | The measurement is out of range |
| B200 | ERROR | 260 Volt | Invalid date | The measurement is out of range |
| B202 | ERROR | | Invalid date | Voltage sensing lost |
| B400 | WARNING | | Invalid date | EEBus pairing failed |
| B200 | ERROR | 260 Volt | Invalid date | The measurement is out of range |

Fig. 19

| Dashboard | Power M. | Connections | Settings | Home Installation | Installation Assistant |

Assignment of Current Sensors

① Grid phases
② Current sensors
③ Current sources
④ Devices
⑤ Overview

Use the table to activate your sensors (CT#) that are physically connected to the grid phases. Select the phase to which the sensor is connected. Then set the current limiting and sensor rated current for each sensor.

| Active | Current transformer | Phase | Sensor rated current | Current limiting |
|---|---|---|---|---|
| ☑ | CT1 | L1 ⌄ | 40 A ⌄ | 0.0 A |
| ☑ | CT2 | L2 ⌄ | 40 A ⌄ | 0.0 A |
| ☑ | CT3 | L3 ⌄ | 40 A ⌄ | 0.0 A |
| ☐ | CT4 | L1 ⌄ | 40 A ⌄ | 0.0 A |
| ☐ | CT5 | L1 ⌄ | 40 A ⌄ | 0.0 A |
| ☐ | CT7 | L1 ⌄ | 40 A ⌄ | 0.0 A |
| ☐ | CT8 | L1 ⌄ | 40 A ⌄ | 0.0 A |
| ☐ | CT9 | L1 ⌄ | 40 A ⌄ | 0.0 A |

Fig. 21

Fig. 22

Dashboard  Power M.  Connections  Settings  Home Installation  Installation Assistant Configuration of Current Source ① Grid phases
② Current sensors
③ Current sources
④ Devices
⑤ Overview Please assign the sensors to the various current sources (main line, photovoltaic system, battery store).

Main line

Please assign the respective sensors to your main line.

Phase 1 connected to
CT1 - L1

Phase 2 connected to
CT2 - L2

Phase 3 connected to
CT3 - L3

Photovoltaic system ⬤ Inactive

Battery storage system ⬤ Inactive

Back                                    Continue

Fig. 24

Dashboard  Power M.  Connections  Settings  Home Installation  Installation Assistant ① Grid phases
② Current sensors
③ Current sources
④ Devices
⑤ Overview

Installation Overview

Check your installation and edit it if required. When you select "Complete installation", the Installation Assistant is terminated and you are automatically transferred to the current sensors.

| Current transferred | | CT1 | CT2 | CT3 | CT4 | CT5 | CT6 | CT7 | CT8 | CT9 | CT10 | CT11 | CT12 |
|---|---|---|---|---|---|---|---|---|---|---|---|---|---|
| Current sources | Mains | L1 | L2 | L3 | | | | | | | | | |
| | Solar panel | | | | | L1 | | | | | | | |
| | Battery | | | | | | | | | | | | |
| Devices | Living room Phase 1 | | | | | | | | | | | | |
| | Garage Phase 1 | | | | | | | | | | | | |
| | EEBus device Phase 1 | | | | | | | | | | | | |

Back    Complete installation

Fig. 25

Fig. 28

Dashboard  Power M.  Connections  Settings  Home Installation  Installation Assistant ① Welcome
②─③ Localization
③ Disclaimer
④ Update & Backup
⑤ Connections
⑥ User Portal
⑦ Tariffs Preferences
⑧ Feed-In
⑨ Smart Charging
⑩ Overview

Disclaimer

Law & data protection for content on the HCM WebConfig
Lorem ipsum
To ensure communication capability and that your Xxxxx charging equipment is up to date, the following device-specific data will be transmitted to, and processed at, Xxxxx at regular intervals by the charging equipment in encrypted form: device ID, make, generation, device type and software version. [ If you optionally wish to use further Xxxxx Connect services for the charging equipment, it is necessary to link your charging equipment to your My Xxxxx Account provided by the particular Xxxxx Connect distributor in selected markets. While the Xxxxx Connect services are being used, the following personal and other device-specific data will be transmitted to and processed by Xxxxx in order to provide and perform these services: customer ID, statistics, charging history information, status, connection status and time stamp of the last connection made. More information about general terms of business and the data protection statement can be found at [ . ] The regular data transmission by your charging equipment can generate additional costs from your Internet service provider. Your data stored at Xxxxx can be permanently deleted using My Xxxxx. Technical or legal restrictions mean that some of the Xxxxx Connect services of the Xxxxx charging equipment are not available in all countries.
Third party licenses < Back                                                    Continue >

Dashboard  Power M.  Connections  Settings  Home Installation  Installation Assistant ① Welcome | Tariff settings
② Localization | Does you tariff change during the year ? ○Yes ●No
③ Disclaimer |
④ Update & Backup | Does you tariff change during the week ? ○Yes ●No
⑤ Connections |
⑥ User Portal | Does you tariff change during the day ? ○Yes ●No
⑦ Tariffs Preferences | Price in ct/kWh
⑧ Feed-In | [ 0 ]
⑨ Smart Charging | < Back                                    Continue >
⑩ Overview

Fig. 32

| Dashboard | Power M. | Connections | Settings | Home Installation | Installation Assistant |
|---|---|---|---|---|---|

Summary

| | | | |
|---|---|---|---|
| Localization | Language<br>Country<br>Zip code | German<br>Andorra<br>14500 | ⟋ Change |
| Update and backup | Automatic update<br>Automatic backup | Inactive<br>Inactive | ⟋ Change |
| Connections | WiFi<br>IP address<br>PLC<br>Ethernet | ◯<br>123.456.7.890<br>◯<br>◯ | ⟋ Change |
| MyXxxxxx-Login | MyXxxxxx-Account:<br>Account linked: | German<br>Andorra | ⟋ Change |
| Tariff settings | Tariff interval<br>Tariff change weekly<br>Tariff change daily | 1<br>No<br>No | ⟋ Change |

① Welcome
② Localization
③ Disclaimer
④ Update & Backup
⑤ Connections
⑥ User Portal
⑦ Tariffs Preferences
⑧ Feed-In
⑨ Smart Charging
⑩ Overview

Fig. 35

LOAD MANAGEMENT SYSTEM AND METHOD FOR MANAGING LOADS IN A POWER DISTRIBUTION GRID

CROSS-REFERENCE TO RELATED APPLICATION

This application claims priority to German Patent Application No. 10 2019 130 337.0, filed Nov. 11, 2019, the content of such application being incorporated by reference herein in its entirety.

FIELD OF THE INVENTION

The invention relates to a load management system and to a method for controlling such a load management system.

BACKGROUND OF THE INVENTION

Such a load management system is used for managing loads present in a power distribution grid. Electrically driven motor vehicles can be charged by means of a charging station using high DC voltages and currents. Such charging stations may also be part of such a power distribution grid. The charging process for the electrically driven motor vehicle can result in the power distribution grid being used to excess, which in the worst case can lead to a total failure of the power distribution grid and in particular of a grid connecting line of the power distribution grid.

Such a power distribution grid is in particular a low voltage distribution grid. The power distribution grid may be a power distribution grid for a household or business premises. If the power distribution grid is in particular a power distribution grid for business premises, then a total failure can lead to a high level of financial loss.

There is therefore frequently a demand or provision for higher grid powers for the power distribution grid if such a charging station is intended to be installed in the power distribution grid.

When electrically operated motor vehicles are charged by means of the charging station, there is the requirement firstly for the motor vehicle to be charged as inexpensively as possible and secondly for the motor vehicle to be charged as quickly as possible. For the latter requirement, as much power as possible should be provided for charging the motor vehicle. If power-generating devices are additionally present in the power distribution grid, another desire may be for the motor vehicle to be charged by a high proportion of the power generated by means of the power-generating devices themselves as far as possible.

Intelligent electricity meters, known as smart meters, that monitor power consumption and attempt to use power when a particularly cheap electricity tariff is applied are known for such power distribution grids.

US 2016/137087 A, which is incorporated by reference in its entirety, discloses a smart charging station for a residential or commercial building that is provided with sensors that are used to measure the charging current and the charging voltage and also the connected phases.

US 2014/077762 A, which is incorporated by reference in its entirety, discloses a smart charging station for a residential building or other building that monitors the power consumption of all devices.

US 2014/062401 A, which is incorporated by reference in its entirety, discloses a method for smart charging electric vehicles, wherein charging takes place at home or in a commercial installation. The charging current is monitored in the process.

US 2011/248678 A, which is incorporated by reference in its entirety, discloses a smart battery management system that receives inputs from current sensors and other sensors.

CN 109130935 A, which is incorporated by reference in its entirety, discloses a smart monitoring system for electric vehicles.

SUMMARY OF THE INVENTION

Described herein is a load management system for managing loads present in a power distribution grid that has a high level of protection against total failure of the power distribution grid. Also described herein is a load management system of the type cited at the outset that allows the maximum power available in the grid to be used for charging the motor vehicle. It would be desirable to maximize the proportion of self-generated power that is used for charging the motor vehicle. Also described herein is a load management system of the type cited at the outset that allows the motor vehicle to be charged as inexpensively as possible. Finally, described herein is a load management system of the type cited at the outset that allows the mains rating to be reduced to a minimum.

The load management system according to aspects of the invention comprises a control unit and at least two current transformers, which are each connected to the control unit by means of a signal cable. A first current transformer of the at least two current transformers is arranged in the power distribution grid such that said first current transformer is suitable for measuring a current level that is dominant in a grid connecting line of the power distribution grid, which grid connecting line is connected to a power supply company. A second current transformer of the at least two current transformers is arranged in the power distribution grid such that said second current transformer is suitable for measuring the current level that is dominant in a power line of the power distribution grid, which power line feeds at least one charging station of the power distribution grid.

The embodiment of the load management system allows a high level of protection against a total failure of the power distribution grid to be achieved. The embodiment of the load management system allows the maximum power available for charging a motor vehicle to be provided at a charging station. The embodiment of the load management system allows the required mains rating for the power distribution grid to be reduced, in particular if power-generating devices are present in the power distribution grid.

In a preferred embodiment, the load management system furthermore comprises at least one third current transformer arranged in the power distribution grid such that said third current transformer is suitable for measuring a current level that is dominant in a supply line for the power distribution grid, which supply line is connected to a power-generating device of the power distribution grid.

This embodiment allows the proportion of self-generated power used for charging the motor vehicle to be maximized.

Preferably, the control unit is furthermore provided with a voltage measuring device suitable for measuring a voltage that is present on at least one current phase, in particular the voltage that is present on a current phase of the grid connecting line.

In a preferred embodiment, the current transformers are analog current transformers.

Preferably, the control unit furthermore comprises a communication module for wired communication and/or for communication by means of radio signals.

The invention furthermore relates to a method for controlling a load management system. The method comprises the following method steps:
continuously measuring the current level that is dominant in the grid connecting line by means of the first current transformer; and
reducing a charging current of the charging station if the current level measured in the grid connecting line is above a predetermined first threshold value.

In a preferred embodiment of the method, the charging station is switched off if the charging current is below a predetermined minimum charging current.

Preferably, the charging current of the charging station is furthermore reduced and/or the charging station is switched off if an electricity tariff that applies to the grid connecting line at this time is a peak tariff.

This embodiment allows the costs for charging a motor vehicle to be reduced.

In a preferred embodiment, the charging current of the charging station is increased if the current level measured in the grid connecting line is below a predetermined second threshold value.

This embodiment allows charging of the motor vehicle to be speeded up.

Preferably, the charging current of the charging station is furthermore increased if an electricity tariff that applies to the grid connecting line at this time is an off-peak tariff.

This embodiment furthermore allows the costs incurred for charging the motor vehicle to be reduced.

In a preferred embodiment, the control unit reads a ripple-control signal that is modulated on the current provided by means of the grid connecting line in order to determine whether an electricity tariff that applies to the grid connecting line at this time is an off-peak tariff or a peak tariff.

BRIEF DESCRIPTION OF THE DRAWING FIGURES

Figure 2:
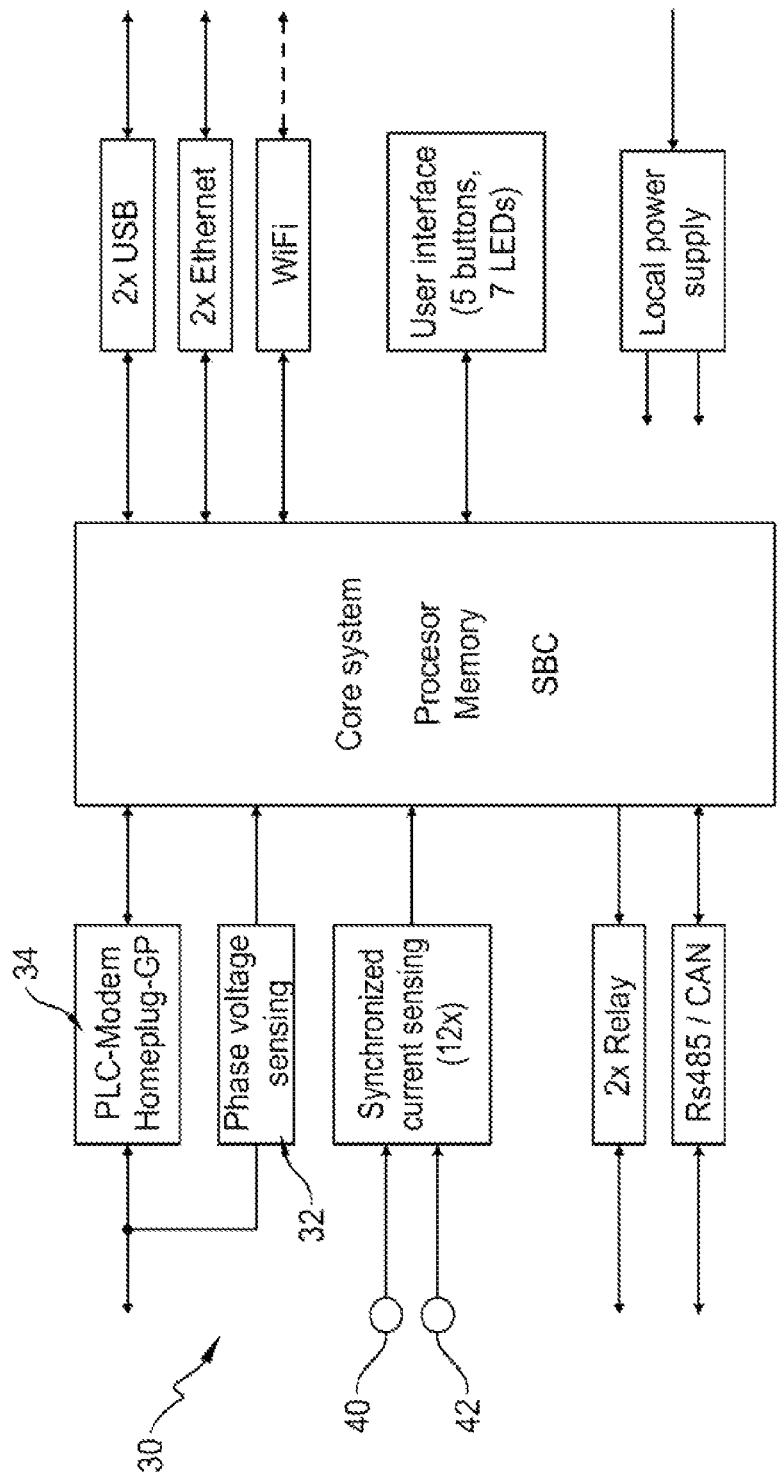
Figure 3:
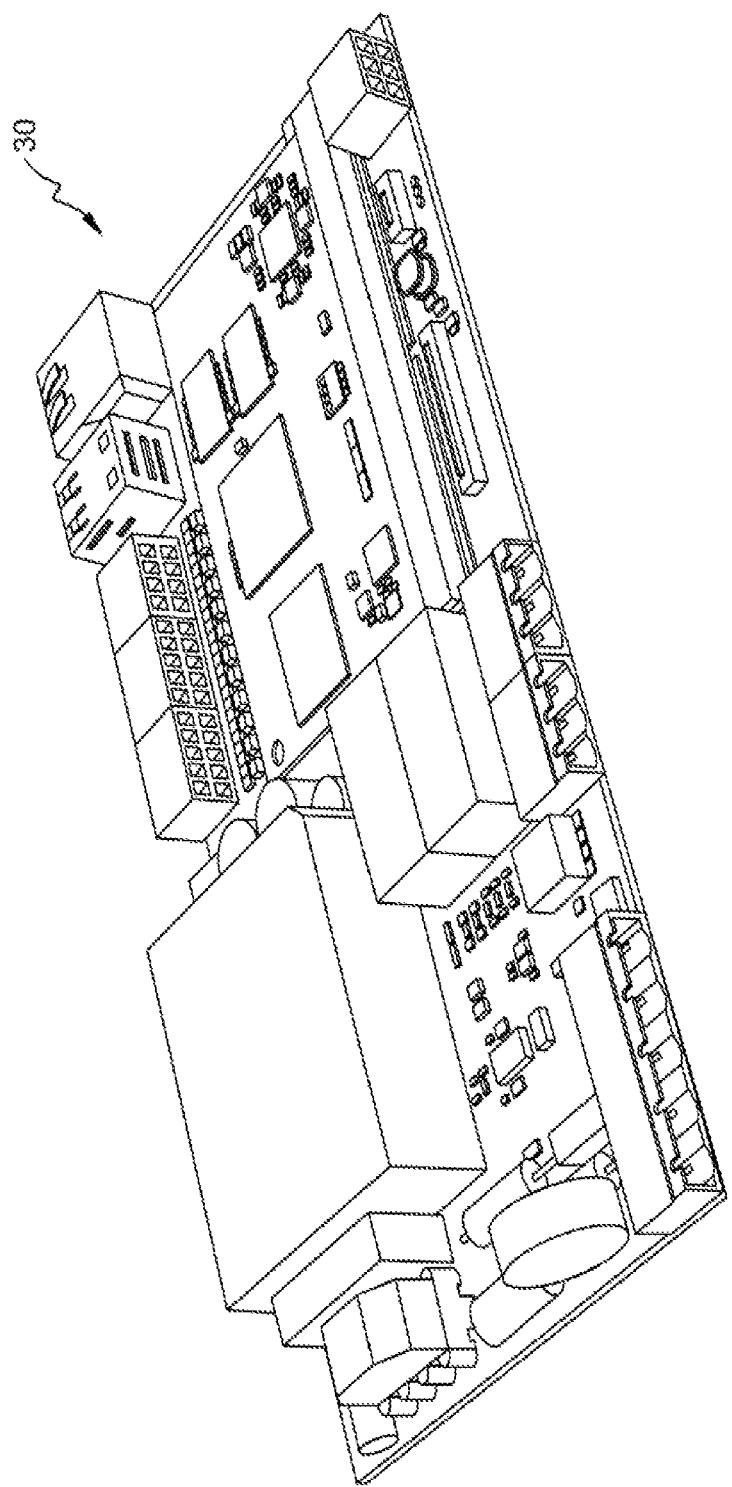
Figure 4:
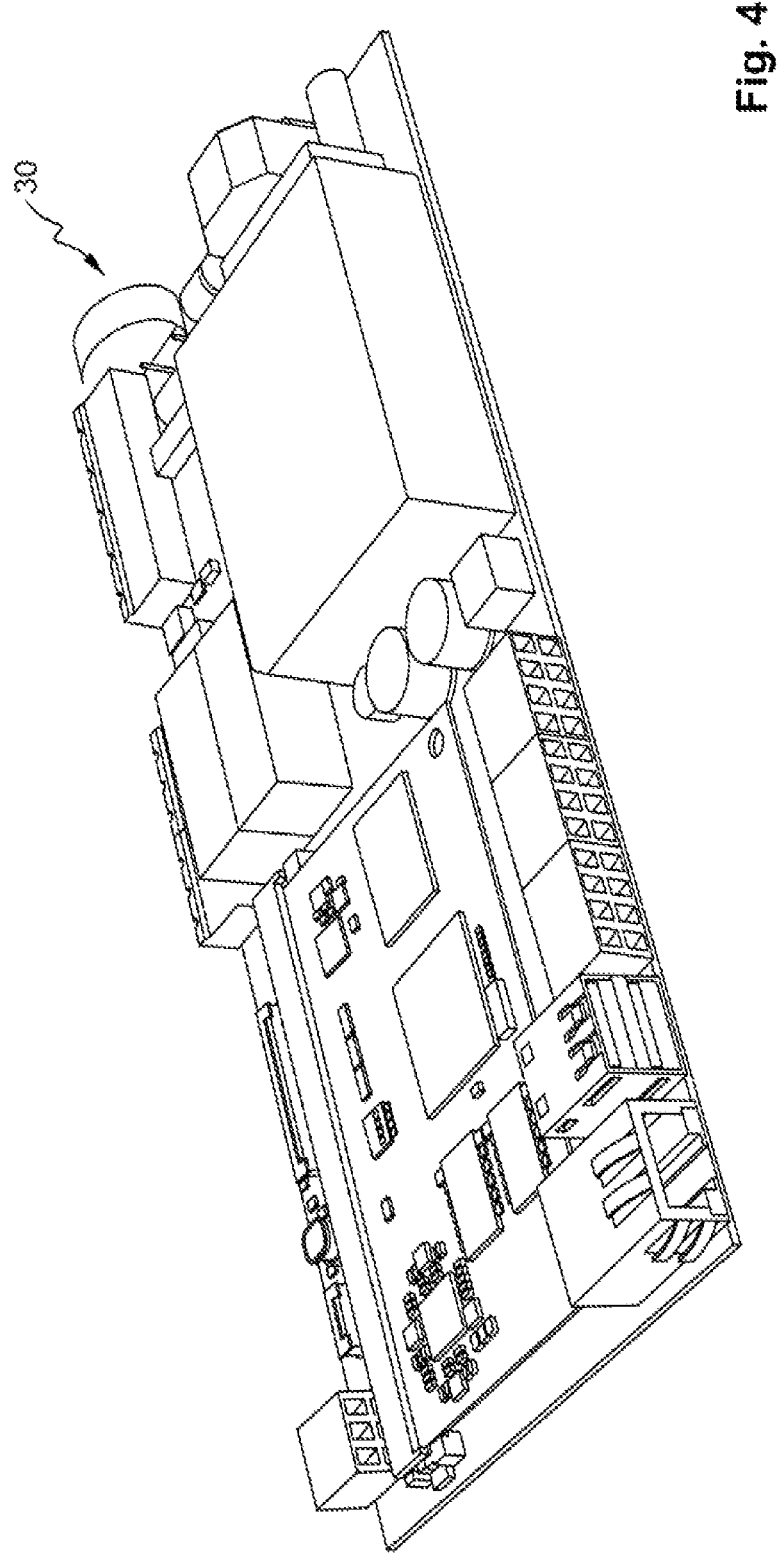
Figure 5:
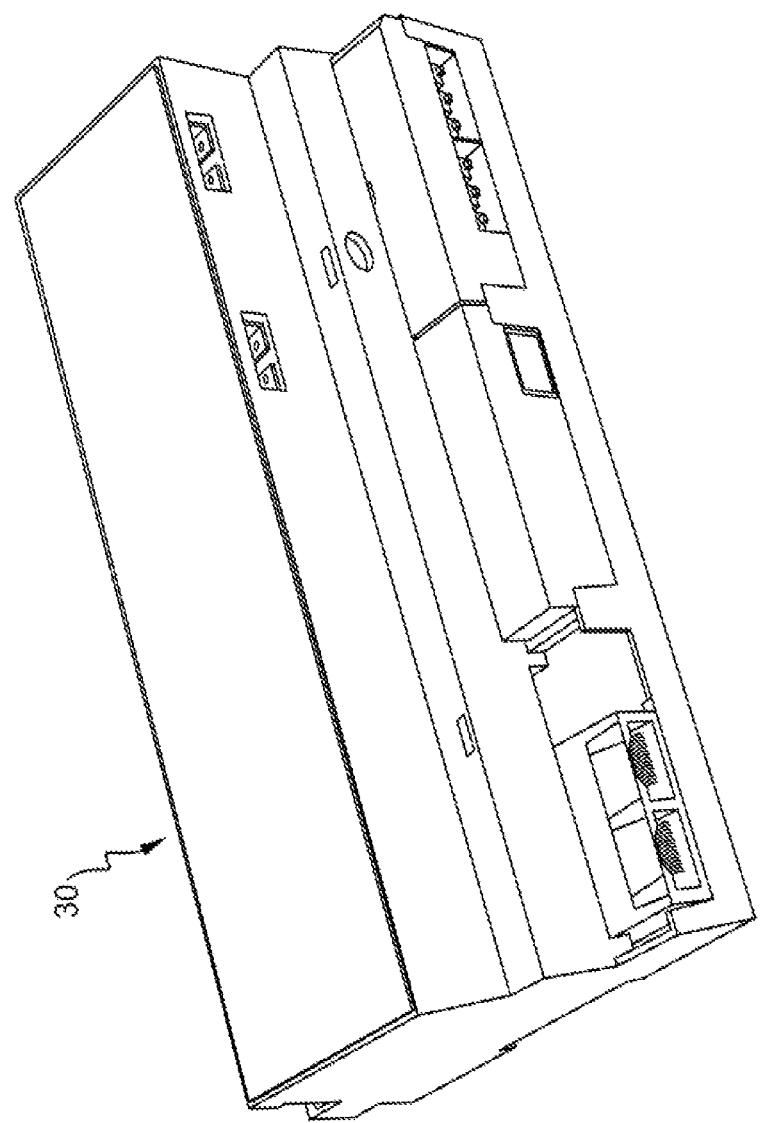
Figure 6:
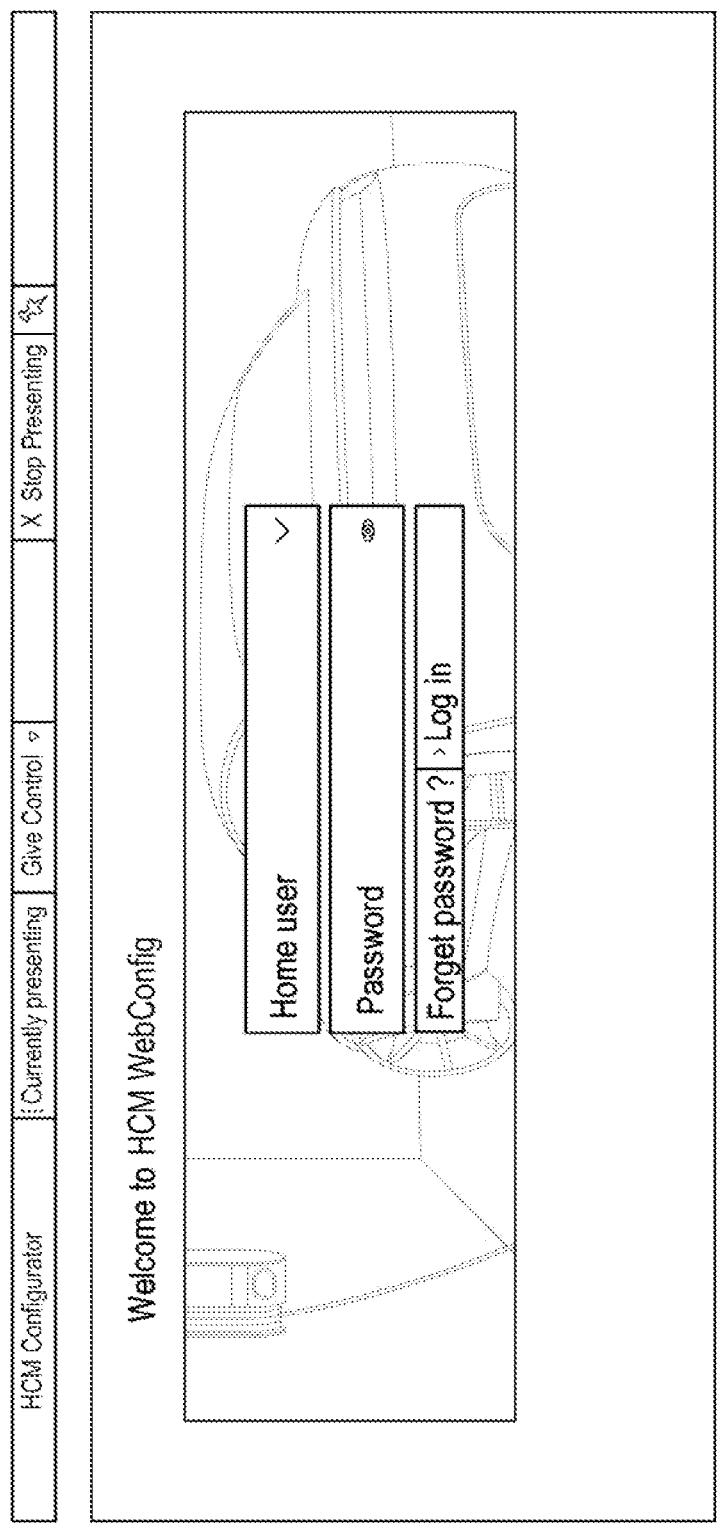
Figure 7:
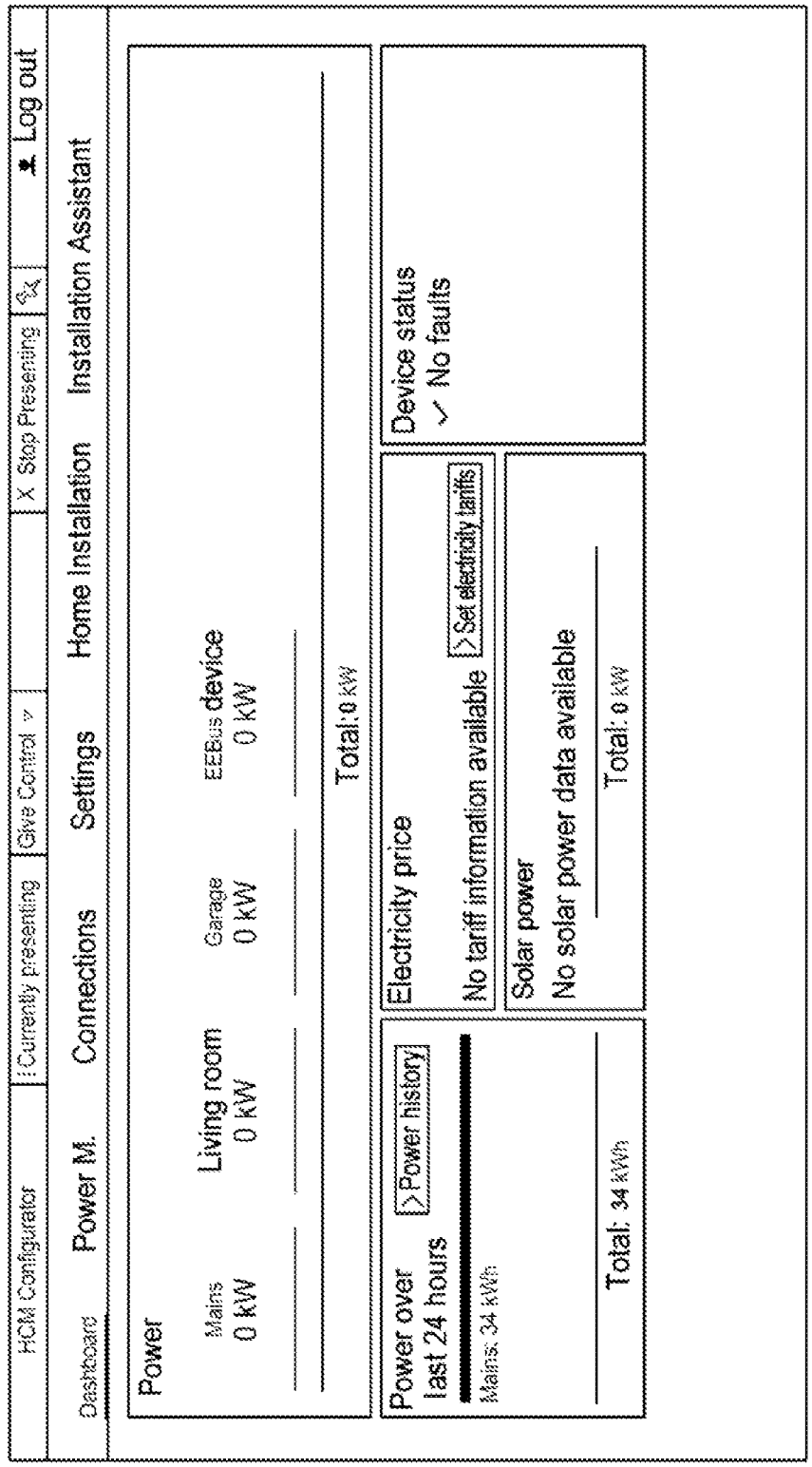
Figure 11:
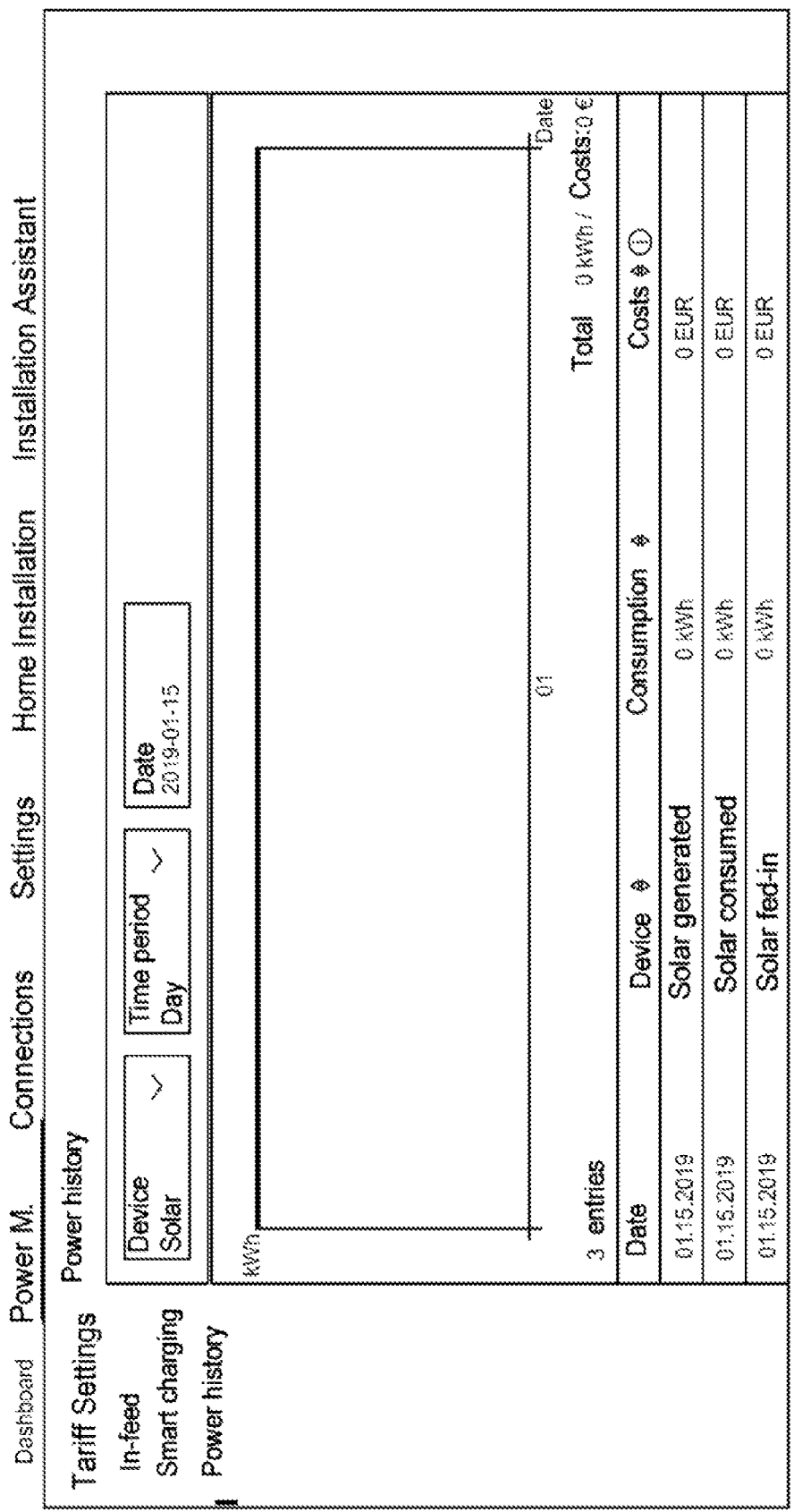
Figure 12:
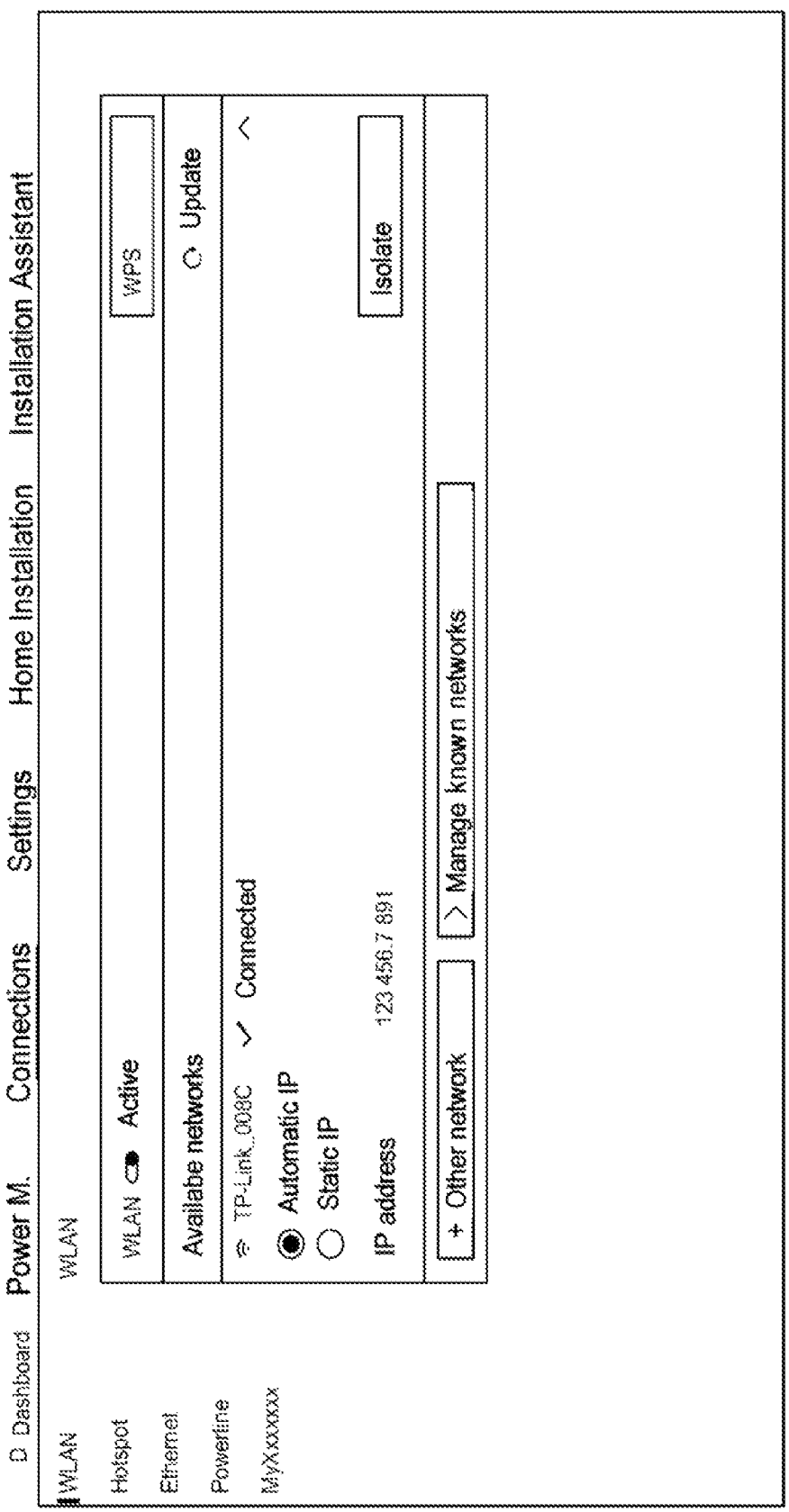
Figure 13:
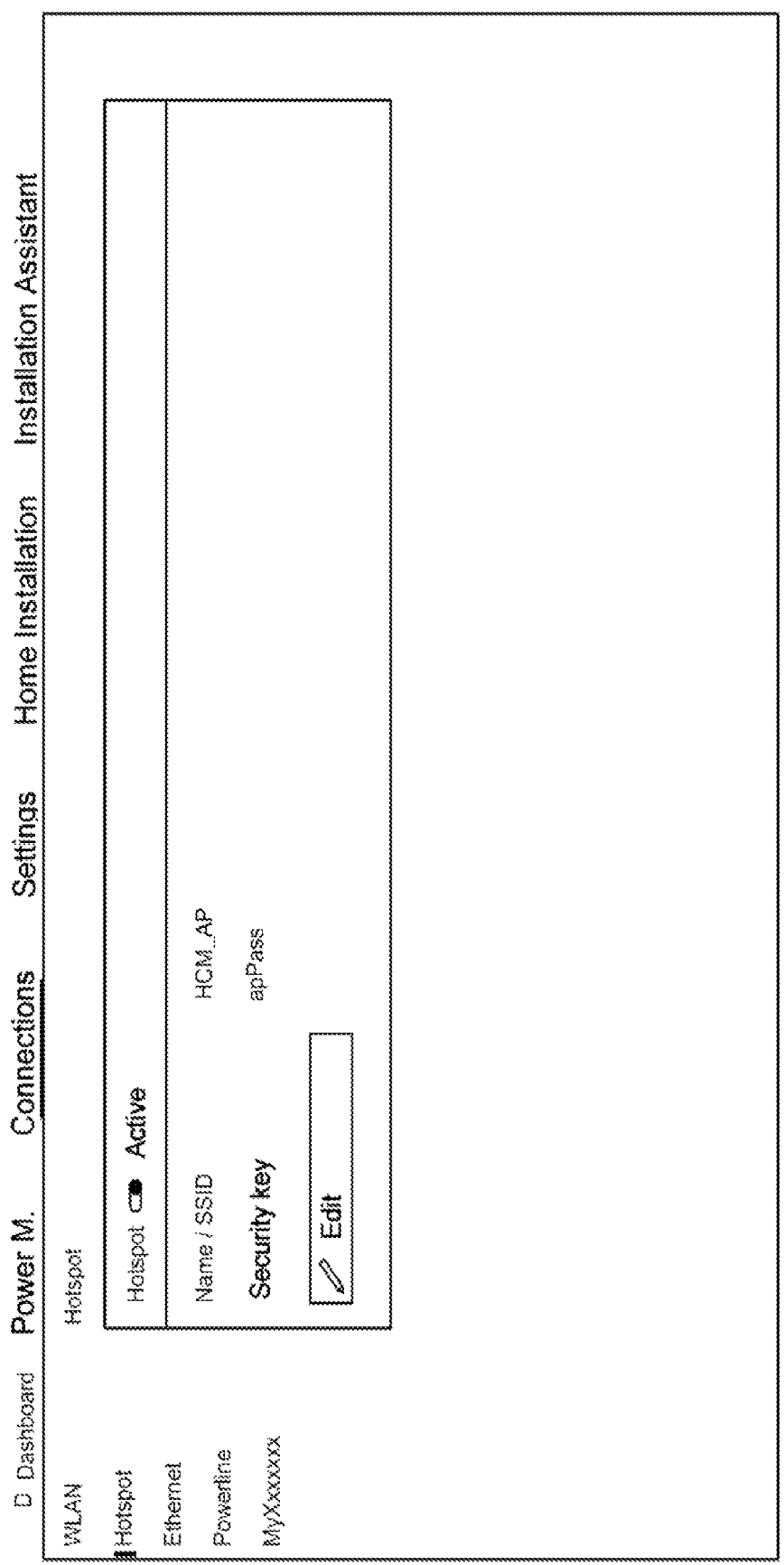
Figure 14:
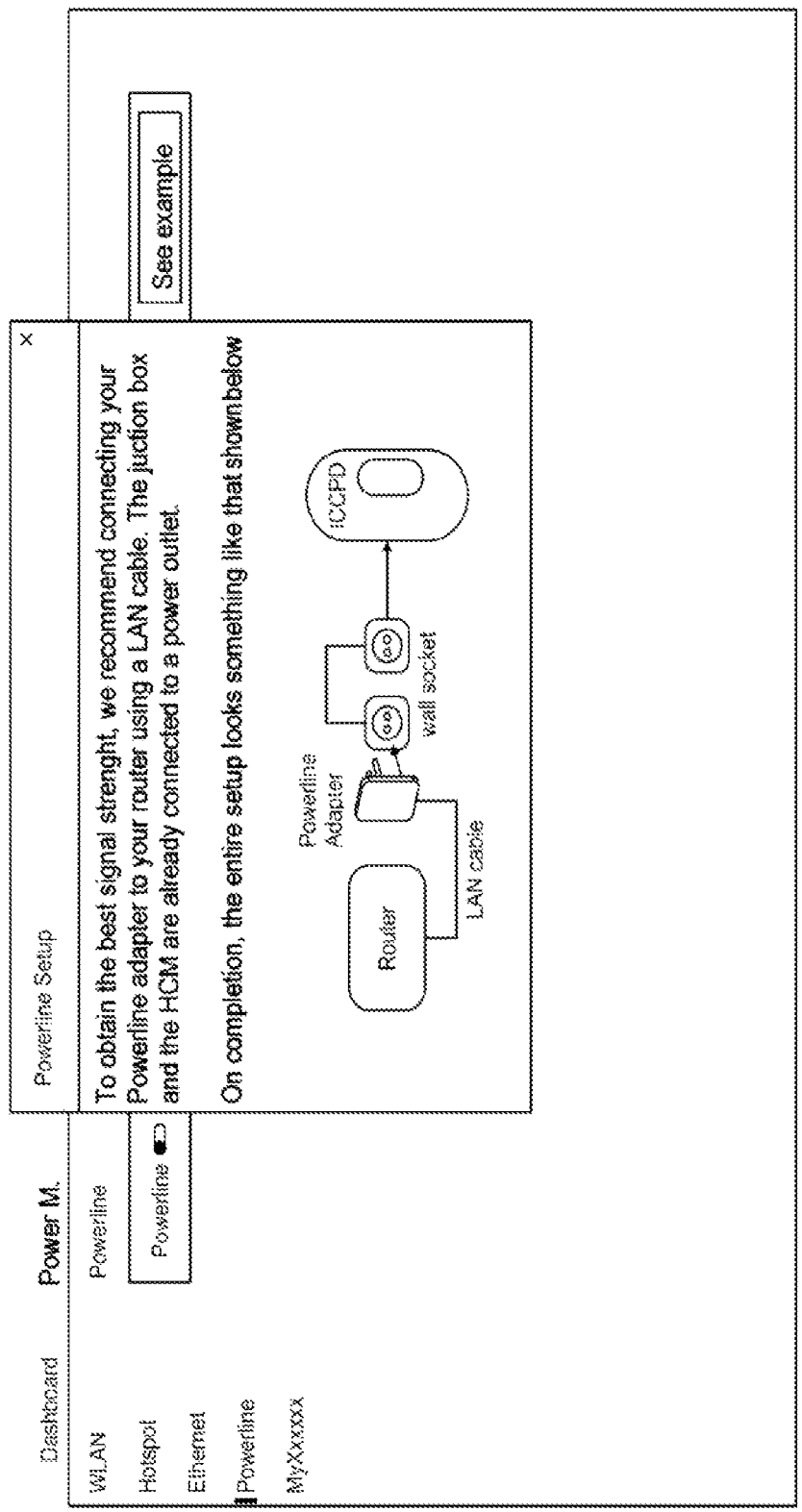
Figure 15:
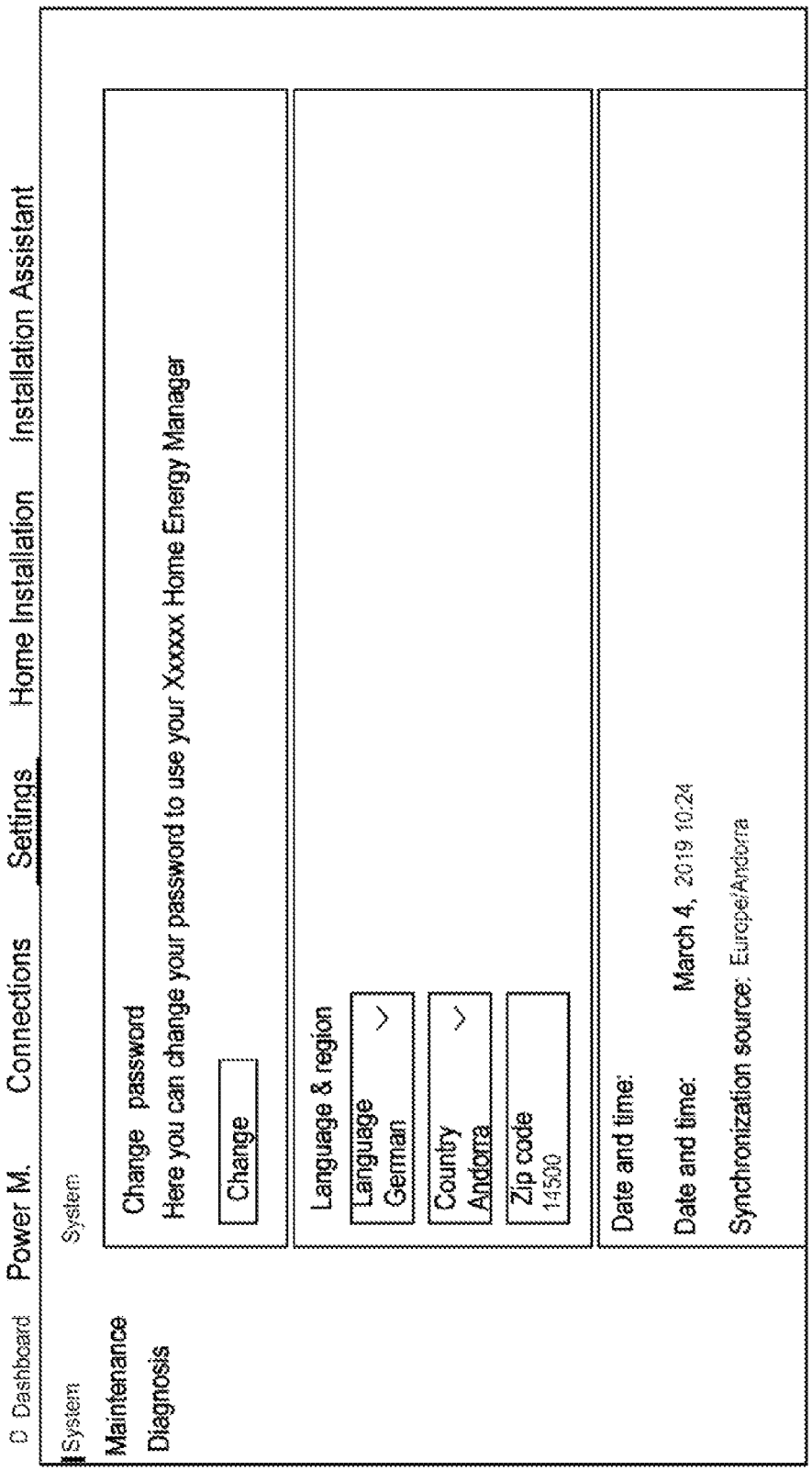
Figure 16:
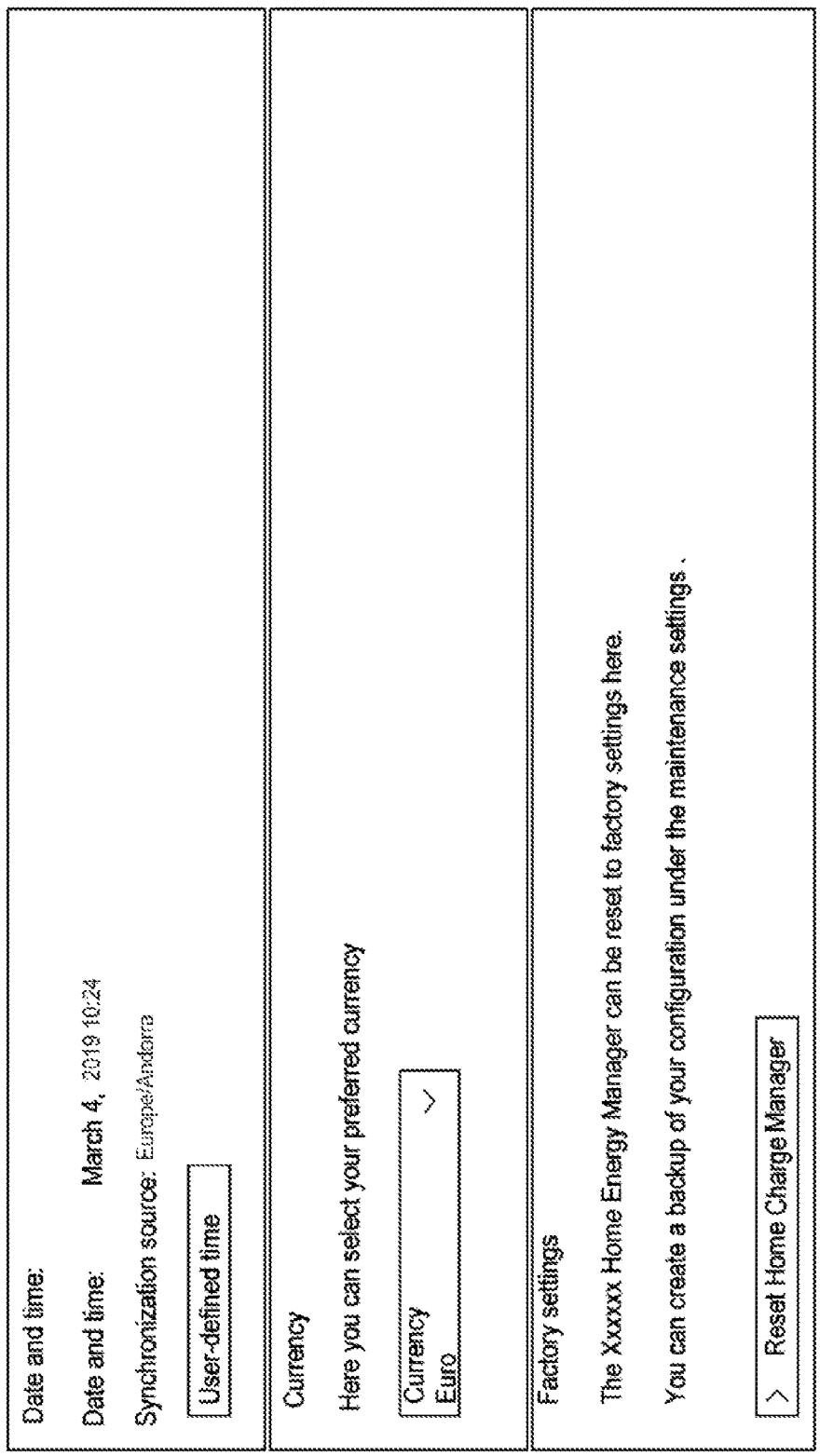
Figure 18:
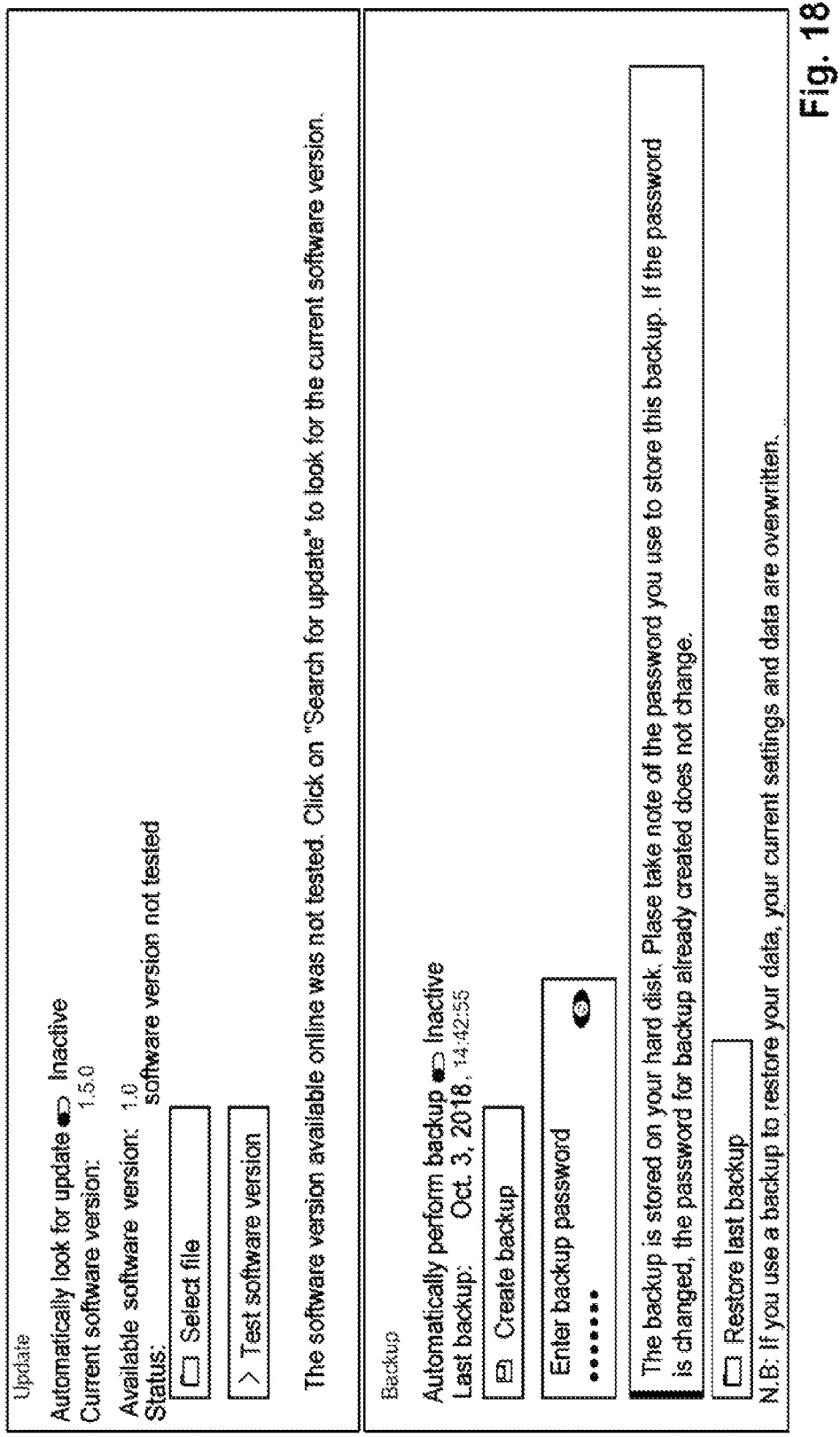
Figure 20:
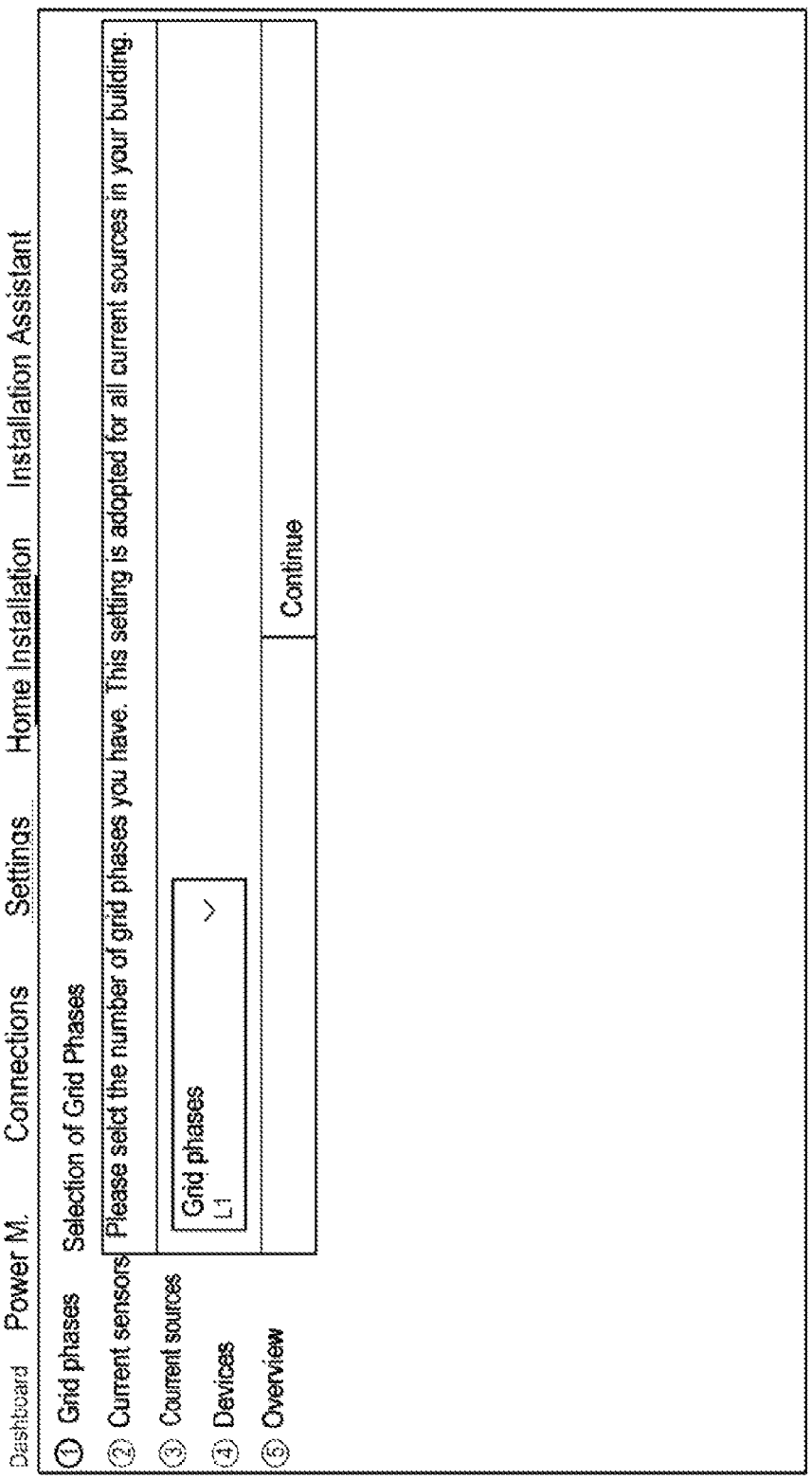
Figure 23:
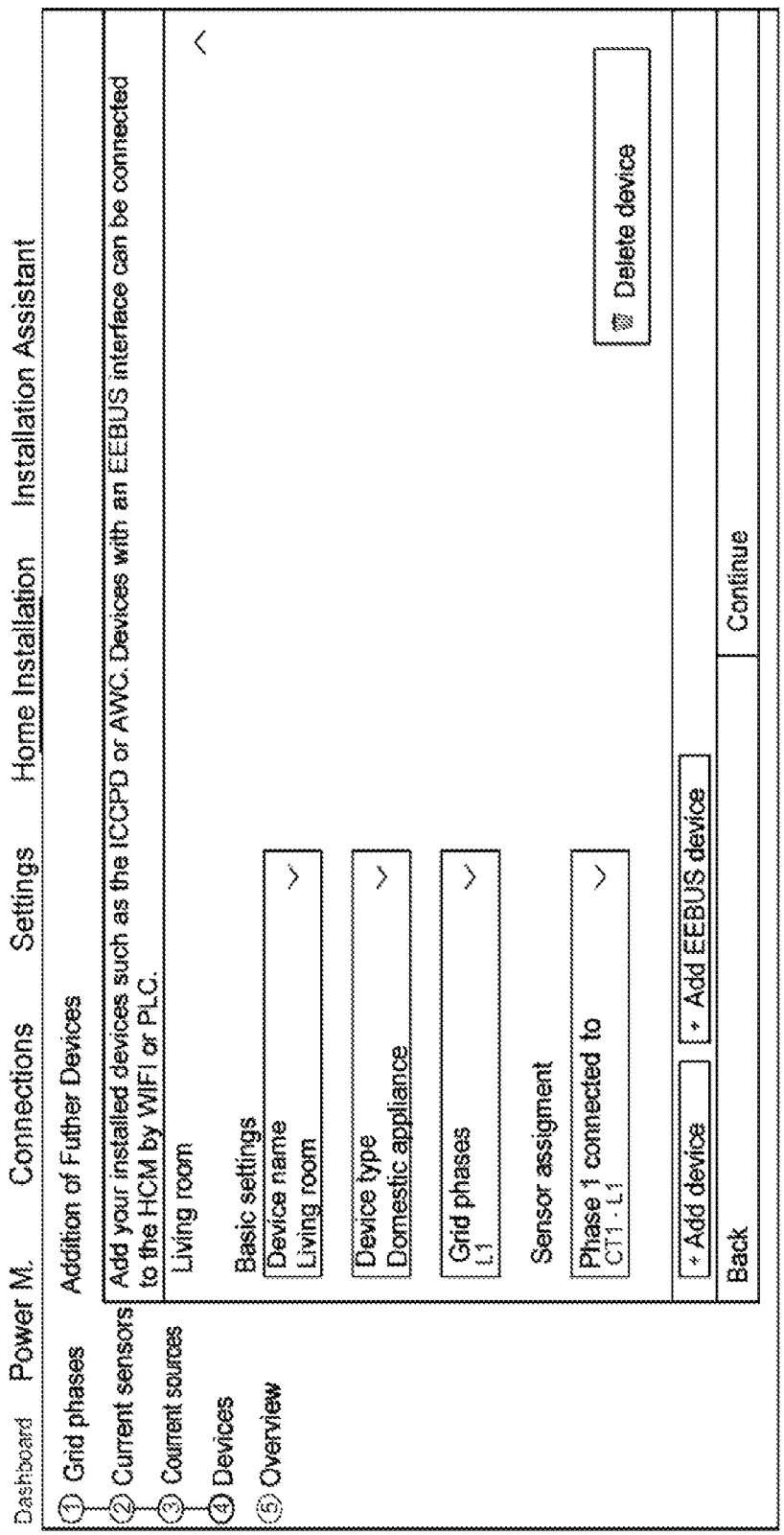
Figure 26:
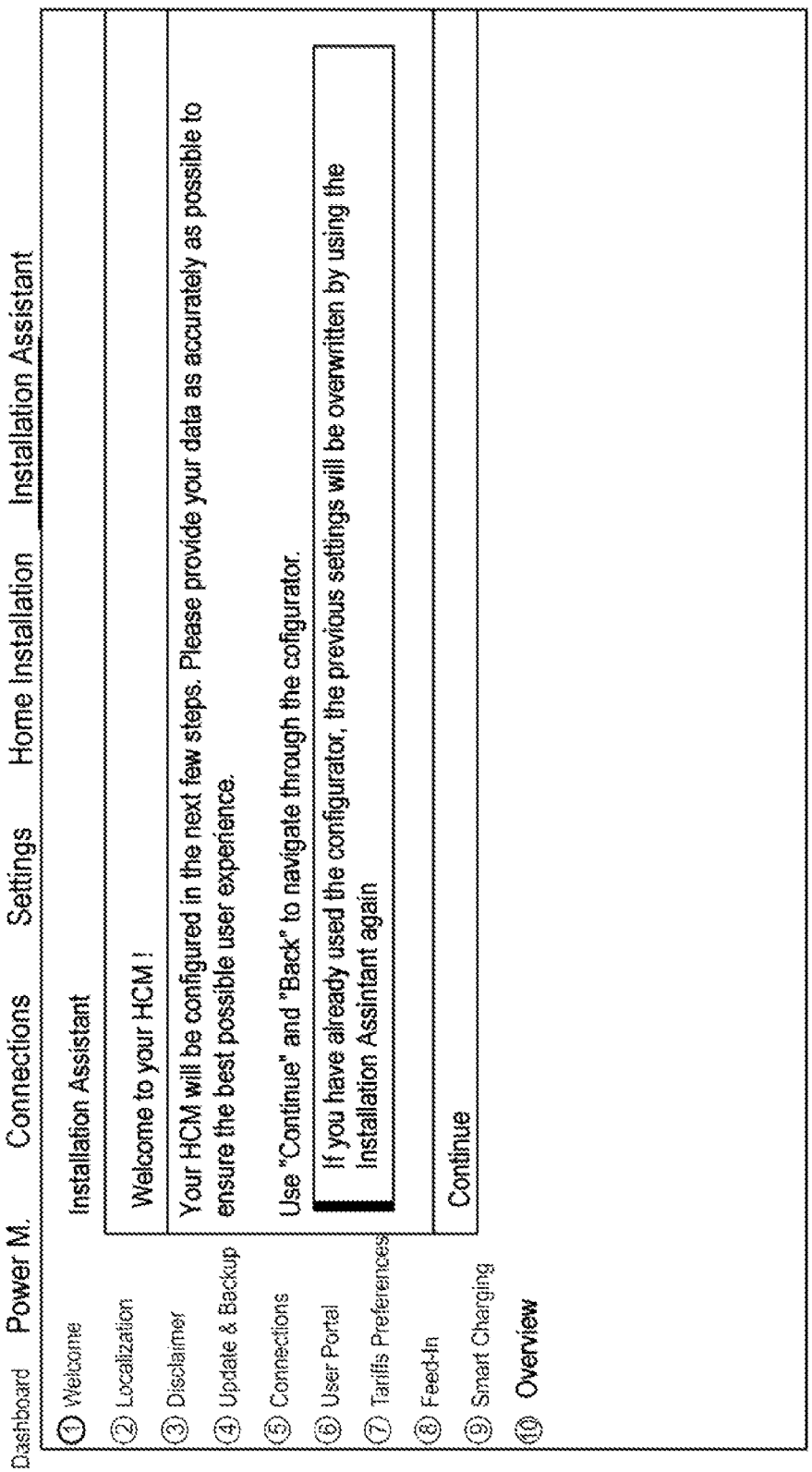
Figure 27:
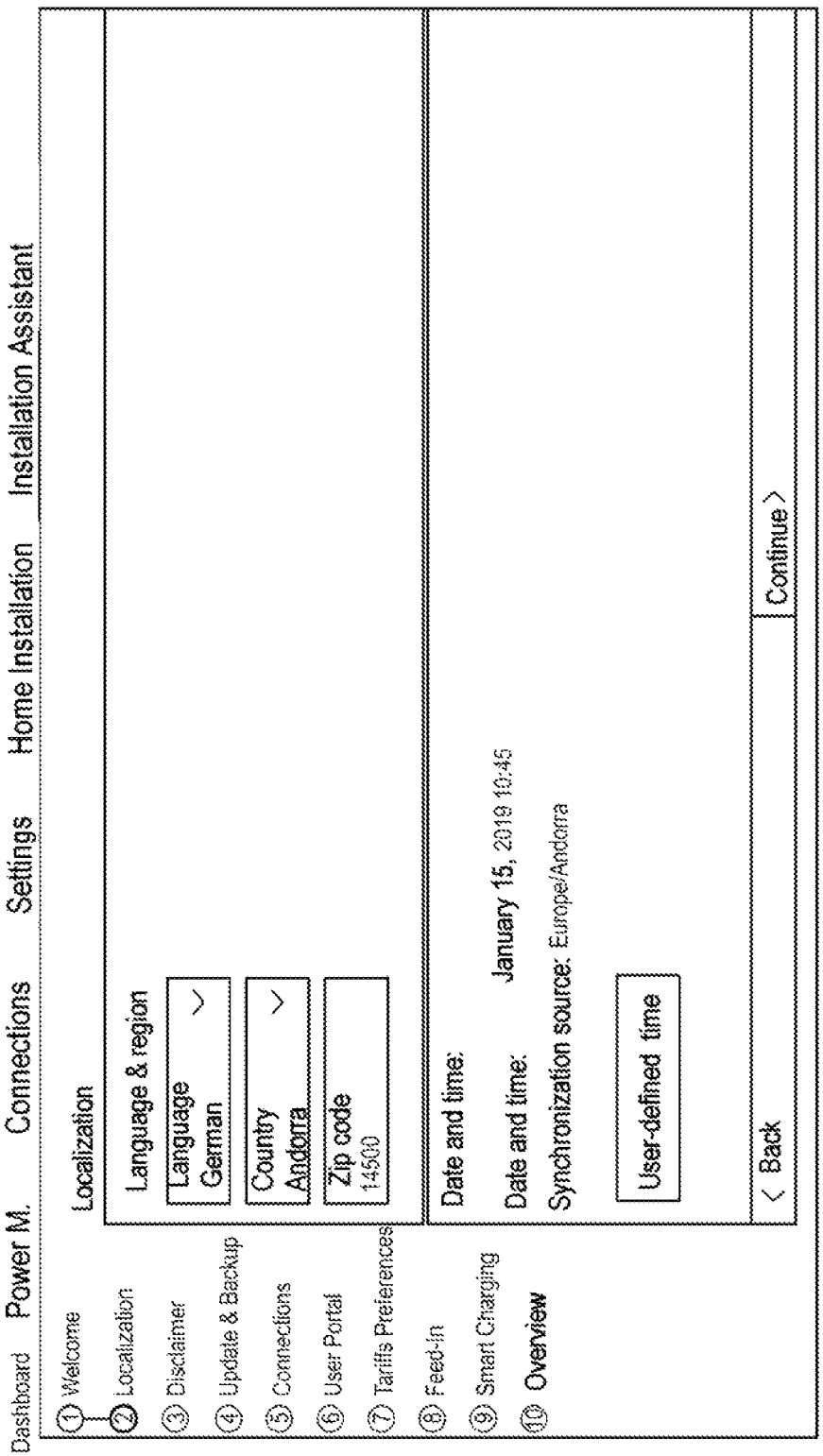
Figure 29:
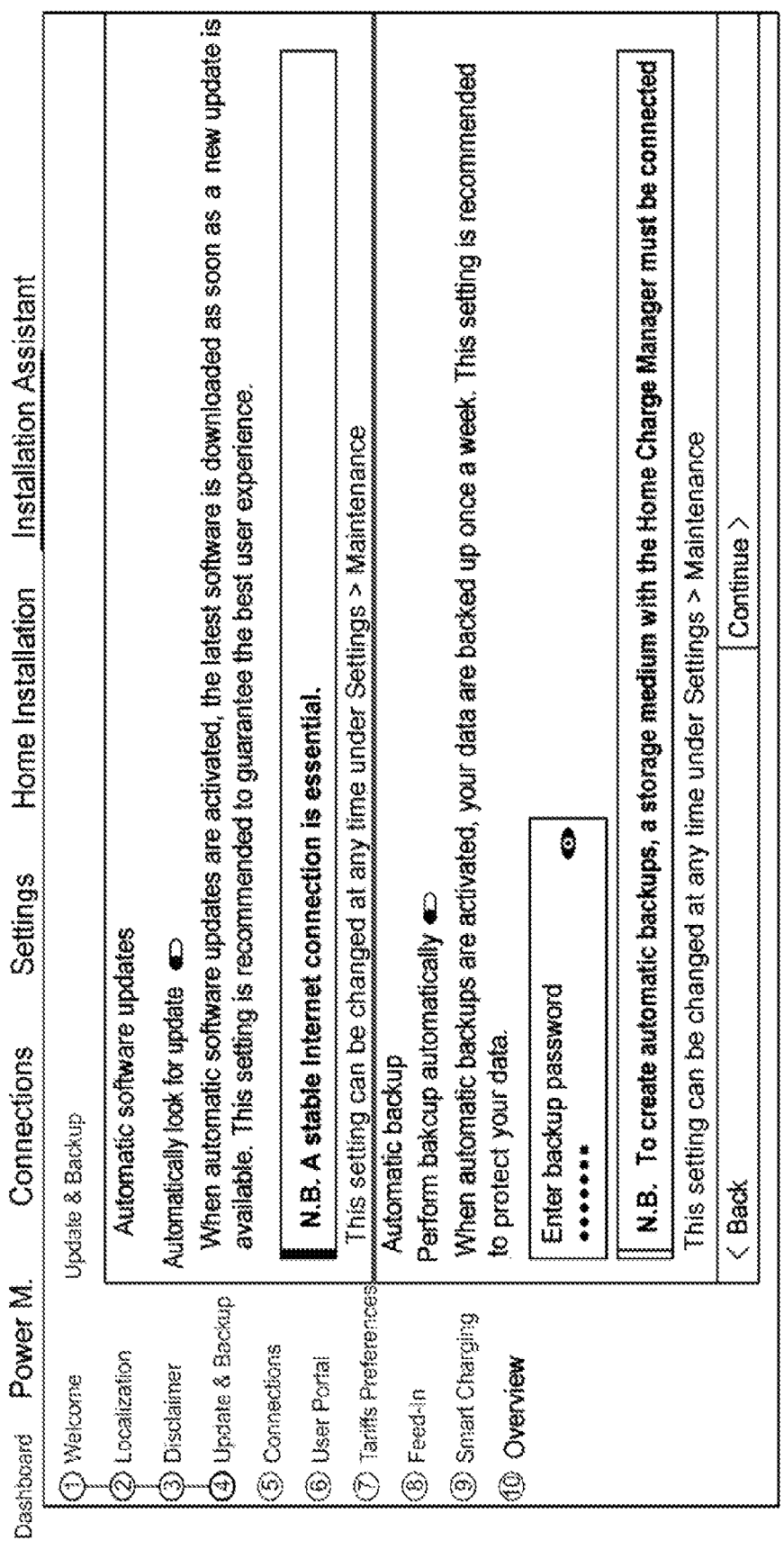
Figure 30:
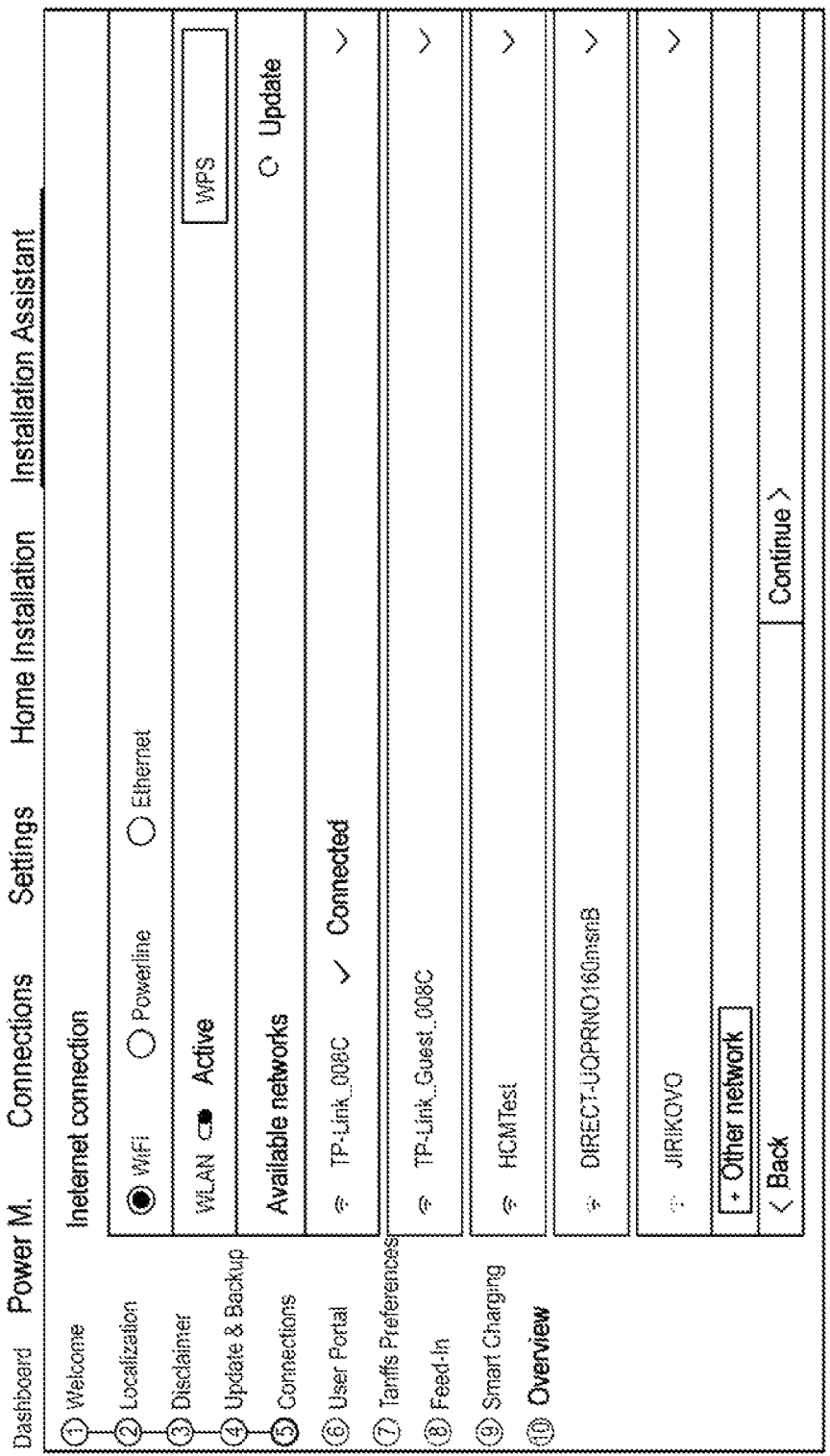
Figure 31:
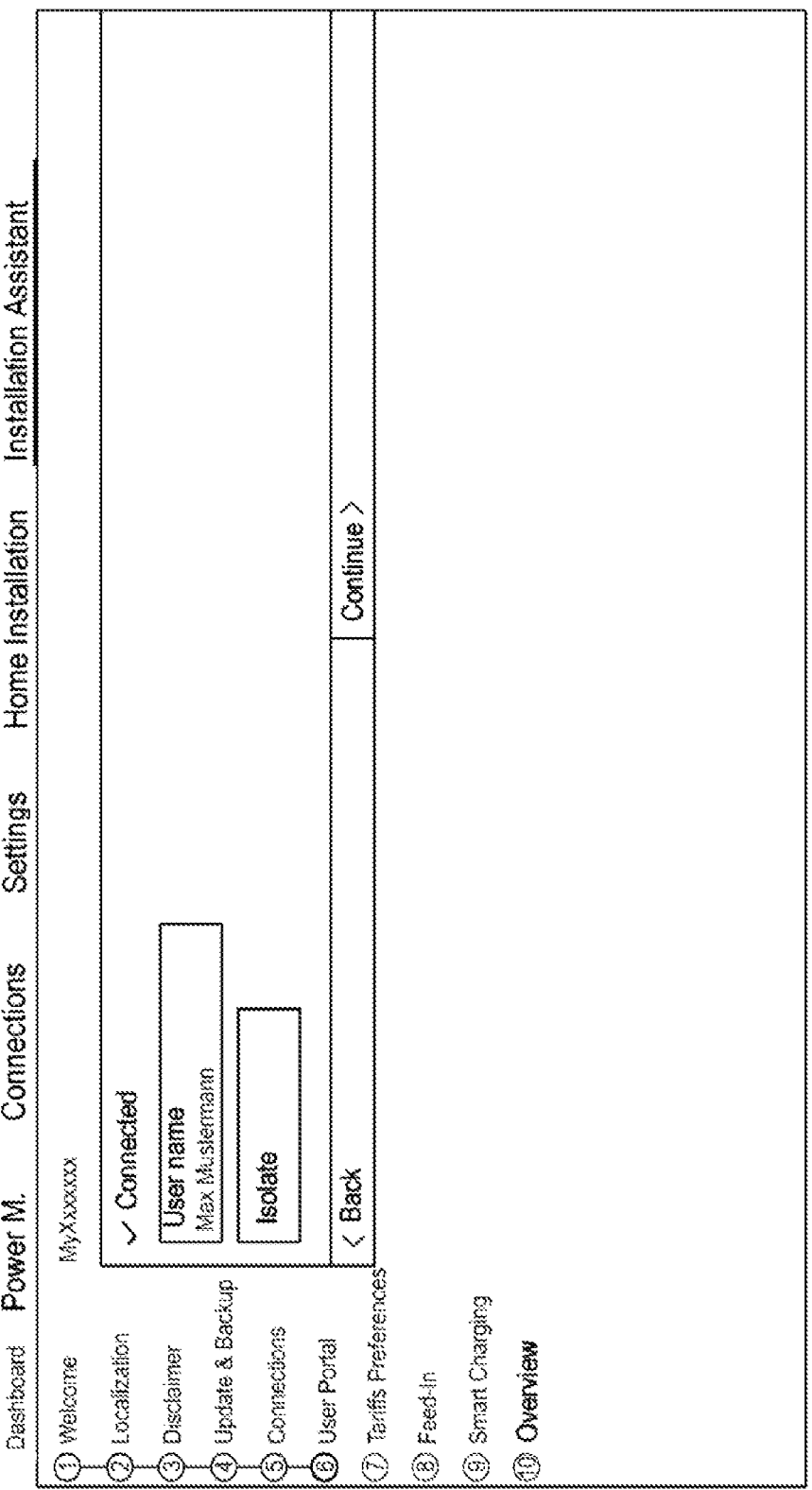
Figure 33:
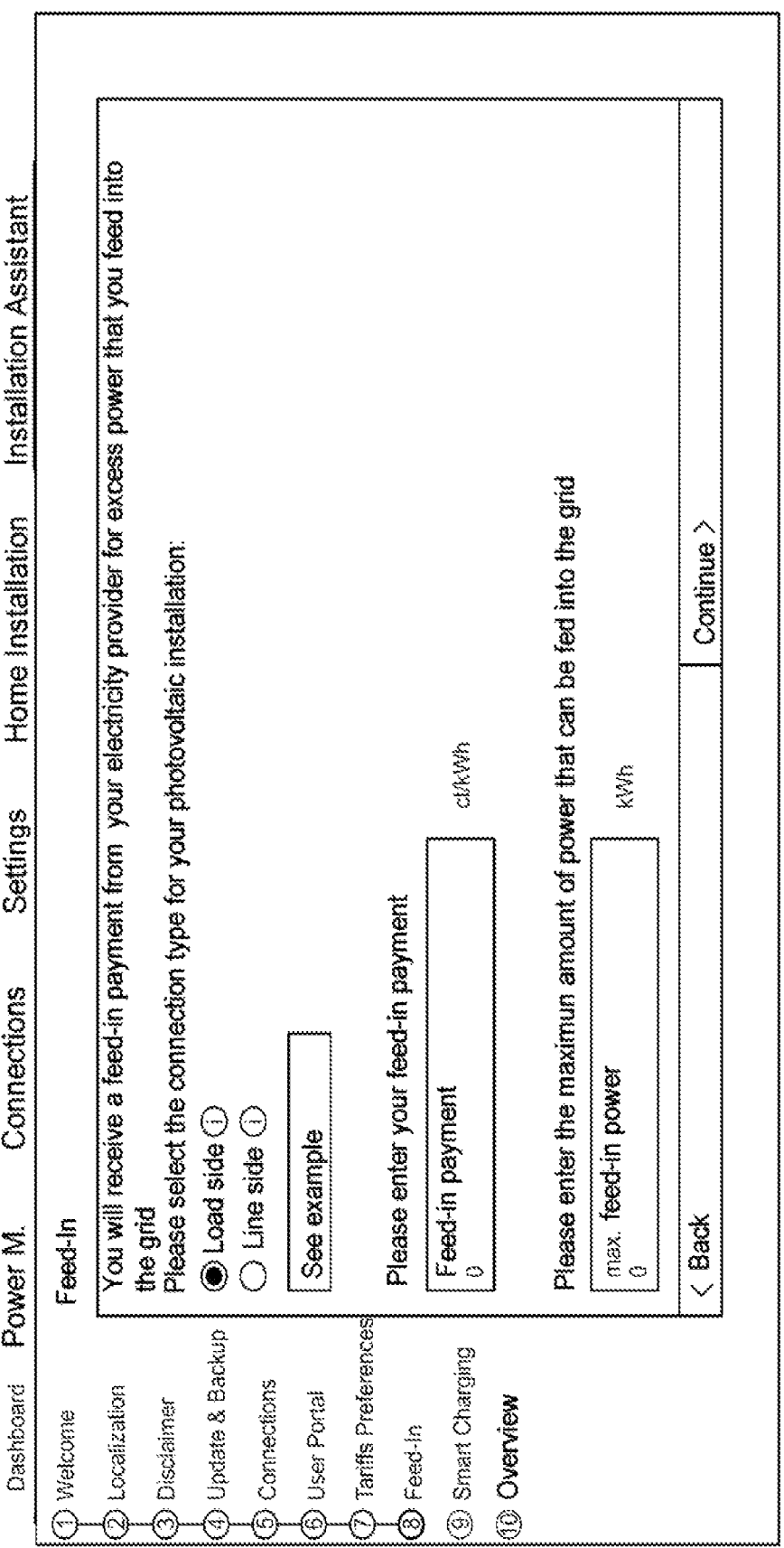
Figure 34:
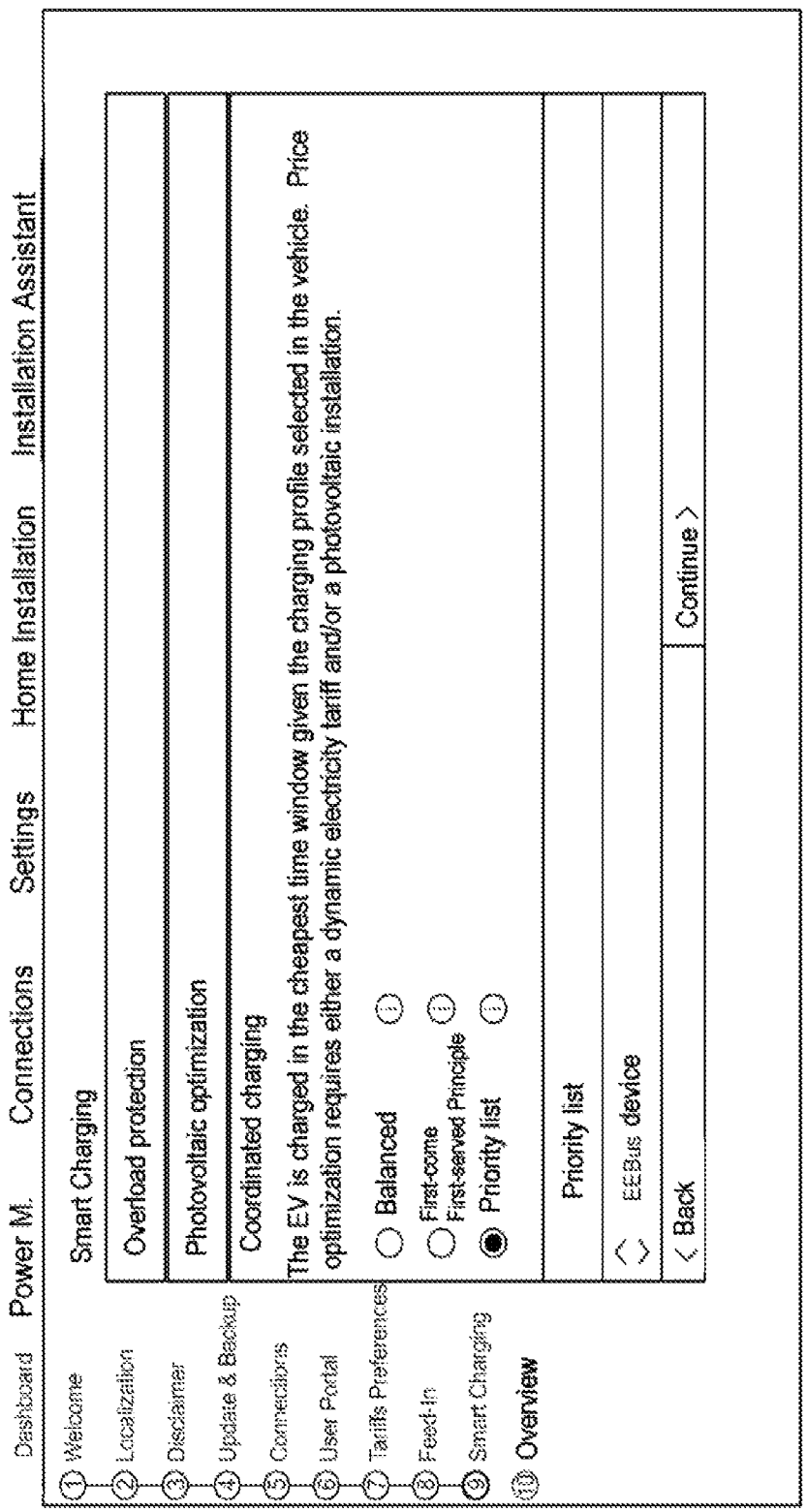
Figure 36:
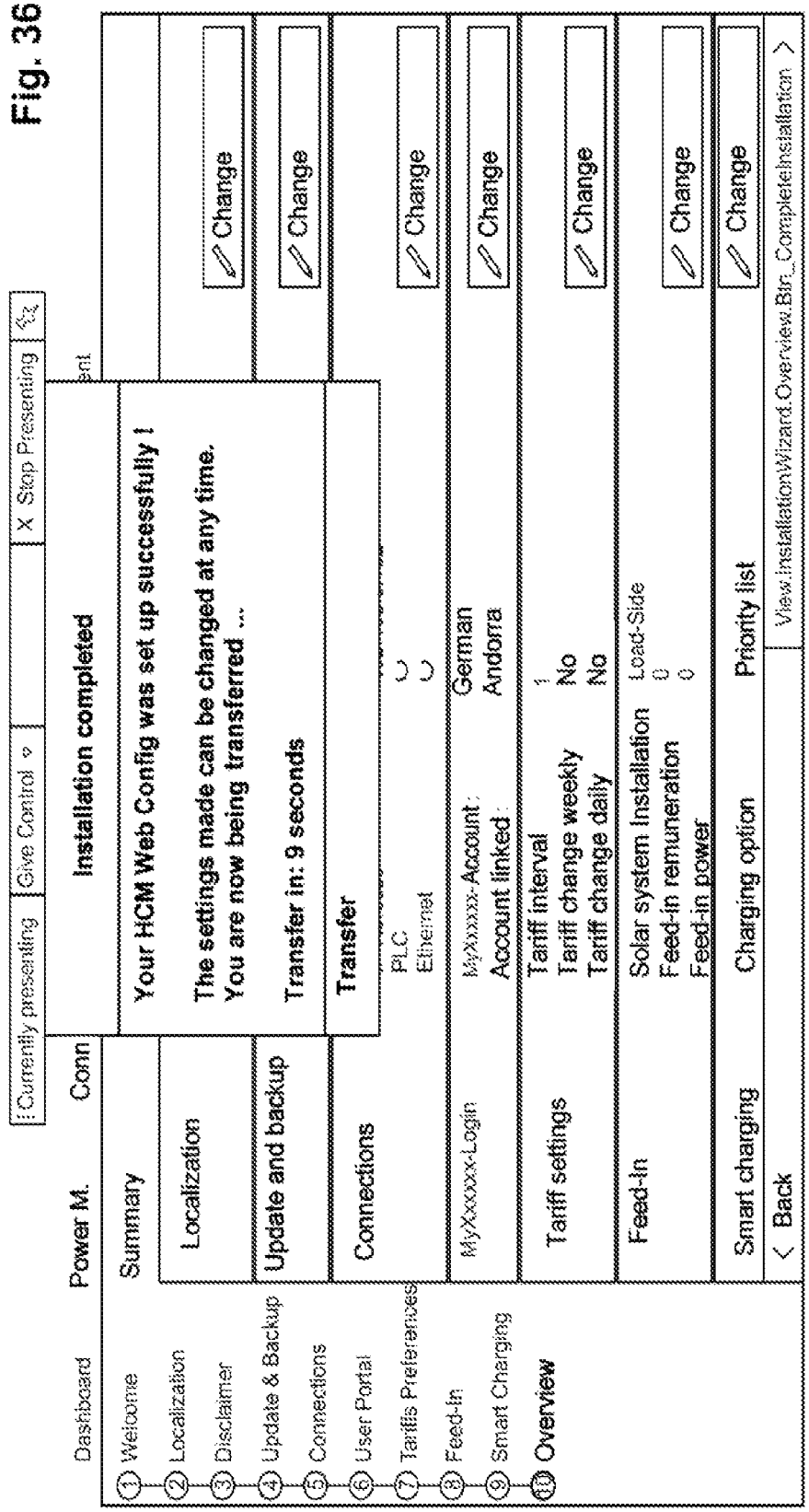

Details and further advantages of the load management system according to aspects of the invention and the method according to aspects of the invention for controlling such a load management system are explained on the basis of the exemplary embodiment described below. In this context:

FIG. 1: shows a schematic view of a power distribution grid with a load management system based on the exemplary embodiment;

FIG. 2: shows a schematic depiction of a control unit of the load management system based on the exemplary embodiment;

FIGS. 3 to 5: show perspective views of the control unit of the load management system based on the exemplary embodiment; and FIGS. 6 to 36: show a user interface of a computer program used for configuring the control unit of the load management system.

DETAILED DESCRIPTION OF THE INVENTION

The application relates to a load management system 20 for managing loads present in a power distribution grid 100, comprising a control unit 30 and at least two current transformers 40, 42, 44, which are each connected to the control unit 30 by means of a signal cable 41, 43, 45. A first current transformer 40 of the at least two current transformers 40, 42, 44 is arranged in the power distribution grid 100 such that said first current transformer is suitable for measuring a current level that is dominant in a grid connecting line 110 of the power distribution grid 100, which grid connecting line is connected to a power supply company. A second current transformer 42 of the at least two current transformers 40, 42, 44 is arranged in the power distribution grid 100 such that said second current transformer is suitable for measuring the current level that is dominant in a power line 112 of the power distribution grid 100, which power line feeds at least one charging station 120 of the power distribution grid 100.

The power distribution grid 100 according to the exemplary embodiment has for example two charging stations 120 that are fed via the same power line 112 of the power distribution grid 100.

If only one charging station 120 is arranged in the power distribution grid 100, however, the second current transformer 42 may be an internal current transformer of the charging station 120. If there are multiple charging stations 120 arranged in the power distribution grid 100, the other current transformers 42 may also be internal current transformers of the charging stations 120, which each transmit their measurement data to the control unit 30, so that the control unit 30 receives all of the data of the power line or power lines 112 going to the charging stations from the charging stations 120.

The signal cables 41, 43, 45 are used for transmitting analog or digital measurement data from the respective current transformer 40, 42, 44 to the control unit 30. If digital measurement data are transmitted from the current transformer 40, 42, 44 to the control unit 30, the signal cables 41, 43, 45 may be network cables (Ethernet cables). Alternatively, the signal cables 41, 43, 45 may be power lines and the transmission of digital or analog measurement data from the current transformer 40, 42, 44 to the control unit 30 is effected via these power lines. The measurement data are preferably transmitted by means of what is known as Powerline Communication (PLC) in this instance. Another option that can be used for transmitting the measurement data from the charging stations 120 to the control unit 30 is a wireless WLAN connection.

The charging station 120 may in particular be a charging station 120 with variable charging power.

The load management system 20 according to the application allows the risk of a total failure of the power distribution grid to be minimized. Furthermore, the load management system according to the application allows the power available from the power distribution grid 100 for charging a battery of an electrically driven motor vehicle by means of the charging station 120 to be maximized. The load management system 20 according to the application can be used to monitor the key currents that are dominant in the power distribution grid.

The power distribution grid 100 may be a power distribution grid for a business premises or a power distribution grid for a house or a residential building. If the load management system 20 according to the application is used in a residential building, in particular in a single-family house, then the load management system 20 can be incorporated into a smart house control system (Smart Home).

High charging powers when charging electric vehicles can lead to overloading in the grid connecting line 110. The overloading can lead to a total failure of the power distribution grid 100 in the worst case, which can give rise to a particularly high level of financial loss if a power distribution grid 100 is a business premises.

The charging operations for electric vehicles are supposed to be able to be performed as inexpensively as possible. Since grid connections increase in price the higher the possible power, the power from the grid needs to be reduced to a minimum so that grid connection costs or the service price can be minimized, provided for example that a charging point with adjustable charging power for electric vehicles is added.

The load management system 20 can furthermore comprise at least one third current transformer 44 arranged in the power distribution grid 100 such that said third current transformer is suitable for measuring a current level that is dominant in a supply line 114 for the power distribution grid 100, which supply line is connected to a power-generating device 130 of the power distribution grid 100.

A load management system 20 according to this embodiment can be used to maximize the proportion of self-generated power for charging the motor vehicle.

The control unit 30 may furthermore be provided with a voltage measuring device 32 suitable for measuring a voltage that is present on at least one current phase, in particular the voltage that is present on a current phase of the grid connecting line 110. This preferred embodiment of the load management system 20 allows power consumptions of the devices fed by the power distribution grid to be monitored.

The current transformers 40, 42, 44 may be analog current transformers. By means of this embodiment, the load management system 20 is compatible with all converters used worldwide for producing the charging current and the charging voltage.

The load management system 20 according to the application is used to combine protection against total failure, or blackout protection, with the entire smart charging infrastructure.

The control unit 30 can furthermore comprise a communication module 34 for wired communication and/or for communication by means of radio signals.

The communication module 34 supports in particular the following communication standards:
bus systems: CAN and RS485;
protocols: EEBus. UDP, TCP, TLS, IPv4, IPv6;
connections: USB 2.0/3.0; LAN and WLAN, PLC (Powerline Communication) via HomePlug standard.

Besides blackout protection, the load monitoring also allows line protection, since the different generators and loads in the power distribution grid 100 can be taken into consideration.

Furthermore, price/current tables allow charging recommendations to be produced, which are produced in particular on the basis of known kilowatt hour reference prices (possibly peak tariff/off-peak tariff), the present phase loads and learned performance curves for the household or the operator. If what are known as smart electricity tariffs are available, these can be read in via suitable interfaces and processed.

The control unit 30 of the load management system 20 can be configured by means of a user interface, which is available in particular in the form of a web interface. As such, the user interface can be used to configure startup and/or power monitoring, and remote diagnosis of the load management system can be performed. The user interface is shown in FIGS. 6 to 36.

The current transformers 40, 42, 44 may be replaceable and can each have a calibrator adapted for the line in which the current level is measured. As such, there may be provision for example for current transformers that are designed for current levels of no more than 50 A to no more than 1000 A.

This embodiment allows the load management system 20 to be adapted flexibly for the power distribution grid 100 that is to be monitored.

The load management system 20 can furthermore comprise switches for actuating or for switching on and off other components/devices of the power distribution grid 100.

The load management system 20 according to the application is intended in particular for use in power distribution grids 100 in which at least one charging station 120 is arranged.

The load management system 20 can be used for smart power management for the power distribution grid 100.

The power distribution grid 100 can comprise a battery store or heat buffer store. The power management can comprise managing the battery store or heat buffer store.

The load management system 20 according to the application can furthermore be used for monitoring a feedback to the grid via the grid connecting line 110.

The charging station 120 may be a charging station that comprises a charging cable with integrated line protection (ICCPD Basis Plus and ICCPD High).

The power management can comprise a load and solar power forecast, which preferably contributes to a learned load behavior of the power distribution grid 100. The learned load behavior can furthermore combine present current and voltage values and weather data.

Worldwide use of the load management system 20 can be ensured among other things by replaceable current transformers 40, 42, 44, which allow a flexible measurement range adapted to the respective power distribution grid 100.

The load management system 20 can furthermore comprise an automatic phase detection system, by means of which it is possible to detect which phase is used to supply power to a load whose current level is monitored by means of one of the current transformers 40, 42, 44.

For the purpose of automatic phase detection, a slightly reduced current level can be provided on the specific phase, a reduced current level measured by one of the current transformers 40, 42, 44 suggesting that the current transformer 40, 42, 44 is fed by the specific phase.

Furthermore, the active power factor (cosine phi) can be automatically detected for the purpose of detecting the grid (regionally) by using the current transformers 40, 42, 44 and the voltage measuring device 32.

Monitoring of the individual phases allows asymmetric charging of the electrically operated motor vehicle in order to promote or produce a load balance in the power distribution grid 100.

In a particular embodiment of the load management system 20, statistics about power consumptions with automatic tips for increasing energy efficiency are provided, for example via the user interface.

The application furthermore relates to a method for controlling a load management system according to the application. The method comprises the following method steps:
continuously measuring the current level that is dominant in the grid connecting line 110 by means of the first current transformer; and
reducing a charging current of the charging station 120 if the current level measured in the grid connecting line 110 is above a predetermined first threshold value The grid connecting line 110 may be in particular a three-phase grid connecting line. The first current transformer 40 may then be designed to measure the current in the individual current phases. That is to say that in the case of a three-phase grid connecting line the load management system according to the application can have three first current transformers 40 in total, each of which is designed to measure the current in a single current phase. In the case of a three-phase grid connecting line the voltage measuring device 32 of the control unit 30 may be designed to measure any voltage that is present on the respective phase of the grid connecting line.

Such a first threshold value can be used to reduce a charging current. The first threshold value may be for example slightly below the maximum permissible current level of the grid connecting line 110.

The charging station 120 can be switched off if the charging current is below a predetermined minimum charging current. As such, the charging station 120 can be switched off in particular if a further reduction in the charging current means that the minimum charging current of the charging station 120 is not reached.

The charging current of the charging station 120 can furthermore be reduced and/or the charging station 120 can be switched off if an electricity tariff that applies to the grid connecting line 110 at this time is a peak tariff.

The charging current of the charging station 120 can be increased if the current level measured in the grid connecting line 110 is below a predetermined second threshold value.

The charging current of the charging station 120 can furthermore be increased if an electricity tariff that applies to the grid connecting line 110 at this time is an off-peak tariff.

The control unit 30 can read a ripple-control signal that is modulated on the current provided by means of the grid connecting line 110 in order to determine whether an electricity tariff that applies to the grid connecting line 110 at this time is an off-peak tariff or a peak tariff.

In a preferred embodiment of the load management system 20 or of the method according to the application, device load profiles are applied. That is to say that the load management system uses the present load profile to detect what types of devices are supplied with power in the power distribution grid 100 at this time and hence for example adversely affect the power requirement of the motor vehicle that is to be charged. As such, for example brief fluctuations in the power consumption of the devices supplied with power in the power distribution grid 100 are waited out until a continuous charging current is available again.

The load management system 20 and in particular the control unit 30 of the load management system 20 may be designed to be able to interpret audio frequency ripple-control signals and to be able to obtain price/performance tables for different electricity tariffs therefrom.

A further interface for conveying information to a user can be provided by means of a voice output on a network loudspeaker of the load management system 20 using text-to-speech commands. This allows the user to be informed about relevant power information by means of a voice output, such as for example:

"power is cheap";

"electric vehicle is currently X percent charged";

"warning: your electric vehicle has been detected in the garage and is currently not connected to the charger";

"reports of excessive or unusual power consumptions"; and

"report of device states by means of evaluation of power profiles".

The load management system 20 and in particular the control unit 30 of the load management system 20 is capable of exchanging information via power lines, in particular by means of what is known as Powerline Communication (PLC).

The control unit 30 is furthermore capable of using this Powerline Communication to also use the transformer of the distribution grid operator to actuate the charging stations 120 for electric vehicles from different households in order to avoid an overload in the line phase.

The method according to the application can be used for configuring the control unit 30 of the load management system 20 by means of a service engineer via a user interface without the service engineer being provided with access to the private customer network.

The same user interface can also be used for power monitoring and remote diagnosis. Time-dependent electricity tariffs can also be input via the user interface. The user interface is shown in FIGS. 6 to 36.

The load management system 20 can be used to produce price and performance tables according to ISO/IEC 15118 as a charging recommendation for electric vehicles.

The load management system 20 and in particular the control unit 30 may be compatible with AC charging stations and/or DC charging stations for motor vehicles.

The functionalities of the user interface are described below.

Access data for the user (username and password) are requested on a first interface of the user interface. The view is then divided into six tabs. These are denoted in the figures as follows: Dashboard, Power Management, Connections, Settings, Home Installation and Installation Assistant.

Dashboard displays an overview of the currently detected powers at the monitored system components. Furthermore, the power consumption is indicated together with a selectable power history. The present electricity price and the device status of the associated components of the load management system are indicated. Finally, the integration of renewable energies, for example solar power, is also indicated.

Under the Power Management tab, there are four sub-items: Tariff Settings, Feed-In, Smart Charging and Power History.

Tariff Settings allow information concerning the present electricity tariffs to be set: e.g. peak tariff (HT)/off-peak tariff (NT) with costs per kWh and the periods to which these apply.

Feed-In first allows selection of how e.g. a power-generating device 130, in particular a photovoltaic installation, is connected in the power distribution grid 100. Furthermore, it is possible to input the feed-in payment and the maximum permitted amount of power that can be fed in.

Smart Charging allows an overcurrent protection system to be activated that allows blackout protection and charging at maximum power. Furthermore, there is the photovoltaic optimization, which involves self-generated power primarily being used for charging and the charging power being adapted accordingly. Finally, there is also coordinated charging. This function is used for charging in the cheapest time window while taking into consideration the vehicle charging profile. Three preferences can be selected here: Balanced, First-come First-served Principle and Priority List.

When Balanced is selected, every vehicle is provided with the same charging power. First-come First-served Principle involves the first arrival receiving the power it wants and the remainder going to the other customers. Priority List involves customers or their vehicles being provided with priorities, and the highest priority is provided with the power that is wanted for this vehicle.

Finally, there is also Power history. In Power History, the power consumptions or power generations for selected devices over any period can be presented graphically and in tabular form.

The Connections tab comprises five subitems: WLAN, Hotspot, Ethernet, Powerline and MyXxxxxxx.

WLAN allows the type of WLAN and which network is selected to be set. Furthermore, the IP address can be output automatically or statically. Hotspot allows a hotspot to be generated with a name and a security key. Ethernet allows the network to be set up using Ethernet. Powerline allows a power line to be activated, so that communication can take place via said power line. MyXxxxxxx provides the customer with access to his MyXxxxxxx Account, so that the data are also sent and recorded there.

Next comes the Settings tab with three subitems: System, Maintenance and Diagnosis.

System allows the password for the load management system 20 to be changed, and it is furthermore possible for language and region to be selected. The date and time can also be set in the next step. Furthermore, the currency can be set and reset to factory settings.

Maintenance provides device information (make and model, part number, serial number, software version and hardware version). It also provides connection information, including e.g the MAC address. A software update can likewise be performed. The update can be provided online or via further connections, for which purpose the current software version is indicated and checked for whether it is consistent with the latest available software version. Finally, a backup can be produced. In this regard, it is possible to select whether a backup is performed automatically, and earlier backups can be included to restore the old data. Diagnosis allows recorded errors to be displayed. Additionally, these can be downloaded in a file.

The next tab is Home Installation with five subitems: Grid Phases, Current Sensors/Current Transformers, Current Sources, Devices and Overview. Grid Phases allows the number of grid phases to be selected, which are then adopted for all current sources in the power distribution grid 100. The current transformers 40, 42, 44 allow up to twelve sensors/transformers to be activated, and which phase they are on and what current values apply to the current transformers 40, 42, 44 to be indicated. Current Sources allows the current sources to be configured. It is used to assign which current transformers 40, 42, 44 are in the grid connecting line 110, which ones are in the supply line 114 and which ones are for example in the battery store. Devices allows the devices that are monitored and with which communication takes place to be added. In this regard, the device location, the device type, the grid phase of the device and the sensor assignment (or transformer assignment) can be indicated. It is also possible for EEBus communicating devices to be added. In this case, the device name, the device type, the SKI number, the grid phase and the sensor assignment (or transformer assignment) are indicated.

Finally, there is Overview, which once again lists all current transformers 40, 42, 44 and their associations with devices and current sources. Here, the installation can be completed or reset in order to edit it again.

A further distinction between the load management system 20 for a power distribution grid 100 for a single household and a load management system 20 for a power distribution grid 100 for a business premises is that the embodiment for a business premises communicates with the charge management server in the charging station 120 and receives actual currents from the charging station 120 and sends specified currents for the charging station 120 to the control unit 30. Timing synchronization is also performed. The plan is also to send maximum currents, power values and the average AC voltage from the charging station 120 to the control unit 30.

The last tab is Installation Assistant, which has ten subitems: Welcome, Localization, Disclaimer, Update and Backup, Connections, User Portal, Tariffs Preferences, Feed-In, Smart Charging and Overview. Welcome provides a brief introduction to the Installation Assistant. Localization goes back to "Settings: System" and sets language and region, date and time. Disclaimer describes the disclaimer. Update and Backup allows automatic software updates and backups to be set, as under "Settings: Maintenance". Connections or Internet connections accesses the Connections tab and permits the WLAN, Powerline and Ethernet settings there. User Portal accesses "Connections: MyXxxxxxx" and allows connection to the user portal MyXxxxxxx.

Tariffs Preferences or tariff settings accesses "Settings: Tariff Options" and allows tariff settings there for changes during the year, month or day. Feed-In goes back to "Power Management: Settings" and allows the same settings as there e.g. for solar installations. Smart Charging goes back to "Power Management: Smart Charging" and allows the same settings as there. Overview displays all of the entered inputs again.

What is claimed:

1. A load management system for managing loads present in a power distribution grid, said load management system comprising:
   a control unit;
   at least three current transformers that are each connected to the control unit by a signal cable; and
   a power-generating device connected to a supply line for the power distribution grid, wherein the power-generating device is a renewable power source for at least one charging station of the power distribution grid,
   wherein:
      a first current transformer of the at least three current transformers is arranged in the power distribution grid such that said first current transformer is configured for measuring a current level in a three-phase grid connecting line of the power distribution grid, said three-phase grid connecting line is-being connected to a power supply company,
      a second current transformer of the at least three current transformers is arranged in the power distribution grid such that said second current transformer is configured for measuring a current level in a first power line of the power distribution grid, said first power line feeding the at least one charging station of the power distribution grid,
      a third current transformer of the at least three current transformers is arranged in the power distribution grid and configured for measuring a current level in a second supply line for the power distribution grid, said second supply line being connected to the power-generating device via the third current transformer, and being configured to feed the at least one charging station of the power distribution grid as a primary power source,
      wherein the control unit is configured to:
         detect which individual phase of the three-phase grid connecting line supplies power to the at least one charging station of the power distribution grid by supplying a predetermined current level on a specific phase of the three-phase grid connecting line and measuring a reduced predetermined current level on the specific phase.

2. The load management system as claimed in claim 1, wherein the control unit comprises a voltage measuring device configured for measuring a voltage that is present on a current phase of the three-phase grid connecting line.

3. The load management system as claimed in claim 2, wherein the control unit is further configured to automatically detect an active power factor by using the first current transformer, the second current transformer, the third current transformer, and the voltage measuring device.

4. The load management system as claimed in claim 1, wherein the current transformers are analog current transformers.

5. The load management system as claimed in claim 1, wherein the control unit furthermore comprises a communication module for wired communication and/or for communication by way of radio signals.

6. The load management system as claimed in claim 5, wherein the second current transformer is an internal current transformer inside the charging station, wherein measurement data obtained by the second current transformer are transmittable to the communication module of the control unit, by way of powerline communication.

7. The load management system as claimed in claim 1, wherein the power-generating device comprises a photovoltaic installation connected in the power distribution grid.

8. The load management system as claimed in claim 1, further comprising a load forecast and a solar power forecast, the load forecast and the solar power forecast contributing to a learned load behavior of the power distribution grid.

9. The load management system as claimed in claim 8, wherein the learned load behavior combines present current and voltage values and weather data.

10. The load management system as claimed in claim 1, wherein the control unit is further configured to perform asymmetric charging of an electrically operated motor vehicle based on which individual phase of the three-phase grid connecting line supplies power to the at least one charging station of the power distribution grid.

11. The load management system as claimed in claim 1, wherein the control unit is further configured to perform an automatic phase detection by supplying the predetermined current level on the specific phase of the three-phase grid connecting line and measuring the reduced predetermined current level on the specific phase by one of the at least three current transformers, wherein the reduced predetermined current level on the specific phase indicates that one of the at least three current transformers is fed by the specific phase.

12. A method for controlling a load management system for managing loads present in a power distribution grid, said load management system including a control unit and at least three current transformers, which are each connected to the control unit by a signal cable, wherein a first current transformer of the at least three current transformers is arranged in the power distribution grid such that said first current transformer is configured for measuring a current level in a three-phase grid connecting line of the power distribution grid, said three-phase grid connecting line being connected to a power supply company, wherein a second current transformer of the at least three current transformers is arranged in the power distribution grid such that said second current transformer is configured for measuring a current level in a first power line of the power distribution grid, which first power line feeds at least one charging station of the power distribution grid, and wherein a third current transformer of the at least three current transformers is arranged in the power distribution grid and configured for measuring a current level in a second supply line for the power distribution grid, said second supply line being connected to a power-generating device connected to the second supply line for the power distribution grid, the method comprising:

continuously measuring the current level in the three-phase grid connecting line by way of the first current transformer;

reducing a charging current of the charging station if the current level measured in the three-phase grid connecting line is above a predetermined first threshold value;

deactivating the charging station when the charging current is below a predetermined minimum charging current;

continuously measuring the current level in the second supply line for the power distribution grid, by way of the third current transformer;

detecting which individual phase of the three-phase grid connecting line supplies power to the at least one charging station of the power distribution grid by supplying a predetermined current level on a specific phase of the three-phase grid connecting line and measuring a reduced predetermined current level on the specific phase;

switching the charging current of the charging station to the power-generating device connected to the second supply line for the power distribution grid, wherein the power-generating device is a renewable power source for the charging station and wherein the power-generating device is connected to the second supply line for the power distribution grid via the third current transformer; and using renewable power from the renewable power source as a primary power source for the charging station.

13. The method as claimed in claim 12, further comprising reducing the charging current of the charging station and/or disconnecting the charging station when an electricity tariff that applies to the three-phase grid connecting line is a peak tariff.

14. The method as claimed in claim 12, further comprising increasing the charging current of the charging station when the current level measured in the three-phase grid connecting line is below a predetermined second threshold value.

15. The method as claimed in claim 12, wherein the control unit reads a ripple-control signal that is modulated on the current provided by way of the three-phase grid connecting line in order to determine whether an electricity tariff that applies to the three-phase grid connecting line is an off-peak tariff or a peak tariff.

16. The method as claimed in claim 12, further comprising increasing the charging current of the charging station when an electricity tariff that applies to the three-phase grid connecting line is an off-peak tariff.

* * * * *